United States Patent
Jiang et al.

(10) Patent No.: US 11,419,099 B2
(45) Date of Patent: *Aug. 16, 2022

(54) COMMUNICATION OF UPLINK CONTROL INFORMATION

(71) Applicant: QUALCOMM Incorporated, San Diego, CA (US)

(72) Inventors: Jing Jiang, San Diego, CA (US); Muhammad Nazmul Islam, Littleton, MA (US); Wei Zeng, Saratoga, CA (US); Sundar Subramanian, Bridgewater, NJ (US); Joseph Binamira Soriaga, San Diego, CA (US); Juergen Cezanne, Ocean Township, NJ (US); Tingfang Ji, San Diego, CA (US); Bilal Sadiq, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 16/664,708

(22) Filed: Oct. 25, 2019

(65) Prior Publication Data

US 2020/0059926 A1 Feb. 20, 2020

Related U.S. Application Data

(63) Continuation of application No. 15/338,012, filed on Oct. 28, 2016, now Pat. No. 10,492,181.

(Continued)

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0055* (2013.01); *H04L 5/0057* (2013.01);
(Continued)

(58) Field of Classification Search
None
See application file for complete search history.

(56) References Cited

U.S. PATENT DOCUMENTS 9,485,763 B2 * 11/2016 You ..................... H04W 72/042
2009/0245190 A1 10/2009 Higuchi et al.
(Continued)

FOREIGN PATENT DOCUMENTS

CN 103118431 A 5/2013
CN 104717042 A 6/2015
(Continued)

OTHER PUBLICATIONS

European Search Report—EP19208366—Search Authority—The Hague—dated Feb. 24, 2020.
(Continued)

*Primary Examiner* — Jeffrey M Rutkowski
*Assistant Examiner* — Ning Li
(74) *Attorney, Agent, or Firm* — Alan Gordon

(57) ABSTRACT

Methods and apparatuses for wireless communication are provided. A transmitting apparatus receives an indication to use multiple subframes to send uplink control information, codes the uplink control information over the multiple subframes based on the indication, and sends the coded uplink control information via the multiple subframes. Sending the coded uplink control information includes transmitting acknowledgement information (ACK) of a current downlink-centric self-contained subframe in an uplink acknowledgement portion of the current downlink-centric self-contained subframe, bundling ACK bits of multiple (Continued)

downlink-centric self-contained subframes and encoding the bundled ACK bits to generate parity acknowledgement bits associated with systematic acknowledgement bits, transmitting the systematic acknowledgement bits in each uplink acknowledgement portion of the multiple downlink-centric self-contained subframes, and transmitting the parity acknowledgement bits associated with the acknowledgement information bits of the multiple downlink-centric self-contained subframes in an uplink-centric self-contained subframe that is sequentially subsequent to the multiple downlink-centric self-contained subframes.

20 Claims, 21 Drawing Sheets

Related U.S. Application Data

(60) Provisional application No. 62/302,284, filed on Mar. 2, 2016, provisional application No. 62/280,889, filed on Jan. 20, 2016.

(51) Int. Cl.
  *H04L 5/14* (2006.01)
  *H04W 72/00* (2009.01)
  *H04W 72/08* (2009.01)
  *H04W 72/12* (2009.01)

(52) U.S. Cl.
  CPC ........ *H04L 5/1469* (2013.01); *H04W 72/00* (2013.01); *H04W 72/048* (2013.01); *H04W 72/082* (2013.01); *H04W 72/121* (2013.01); *H04L 5/0007* (2013.01); *H04L 5/0044* (2013.01)

(56) References Cited

U.S. PATENT DOCUMENTS

| | | | |
|---|---|---|---|
| 2010/0202308 A1 | 8/2010 | Gorokhov et al. | |
| 2010/0220623 A1 | 9/2010 | Cave et al. | |
| 2011/0110322 A1* | 5/2011 | Koyanagi | H04L 5/0094 370/329 |
| 2011/0205983 A1 | 8/2011 | Bharadwaj et al. | |
| 2011/0243066 A1 | 10/2011 | Nayeb et al. | |
| 2011/0249578 A1 | 10/2011 | Nayeb et al. | |
| 2012/0257519 A1* | 10/2012 | Frank | H04W 52/16 370/252 |
| 2013/0223294 A1 | 8/2013 | Karjalainen et al. | |
| 2013/0235807 A1* | 9/2013 | Lee | H01Q 1/246 370/329 |
| 2014/0177572 A1 | 6/2014 | Papasakellariou et al. | |
| 2015/0245323 A1* | 8/2015 | You | H04W 72/042 370/329 |
| 2015/0280876 A1 | 10/2015 | You et al. | |
| 2016/0191212 A1 | 6/2016 | Park et al. | |
| 2016/0270081 A1* | 9/2016 | Jeon | H04W 72/08 |
| 2017/0013565 A1 | 1/2017 | Pelletier et al. | |
| 2017/0180098 A1 | 6/2017 | You et al. | |
| 2017/0208583 A1 | 7/2017 | Jiang et al. | |
| 2017/0245265 A1 | 8/2017 | Hwang et al. | |
| 2017/0280454 A1 | 9/2017 | Kusashima et al. | |
| 2018/0092052 A1* | 3/2018 | Liu | H04W 52/343 |
| 2018/0343043 A1* | 11/2018 | Hakola | H04W 36/0016 |
| 2018/0367285 A1 | 12/2018 | Yi et al. | |

FOREIGN PATENT DOCUMENTS

| | | | | |
|---|---|---|---|---|
| WO | 2017014912 A1 | 1/2017 | | |
| WO | 2017024561 A1 | 2/2017 | | |
| WO | WO2017/024561 A1 * | 2/2017 | ............ | H04W 72/04 |

OTHER PUBLICATIONS

International Preliminary Report on Patentability—PCT/US2016/066215, The International Bureau of WIPO—Geneva, Switzerland, dated Aug. 2, 2018.
International Search Report and Written Opinion—PCT/US2016/066215—ISA/EPO—dated Jun. 29, 2017.
Levanen T., et al., "Dense Small-Cell Networks: Rethinking the Radio Interface Beyond LTE-Advanced", 1st International Conference on 5G for Ubiquitous Connectivity, ICST, Nov. 26, 2014 (Nov. 26, 2014), pp. 163-169, XP032735039, DOI: 10.4108/ICST.5GU.2014.258115 [retrieved on Feb. 11, 2015].
LG Electronics: "Details on SR, SRS, and SPS transmission for MTC UE", 3GPP TSG RAN WG1 Meeting #83, 3GPP Draft; R1-156848 SR and SRS V2, 3rd Generation Partnership Project (3GPP), Mobile Competence Centre; Lucioles; F-06921 Sophia-Antipolis Cedex; France, vol. RAN WG1, No. Anaheim, USA; Nov. 15, 2015-Nov. 22, 2015, Nov. 7, 2015 (Nov. 7, 2015), 6 Pages, XP051022532, Retrieved from the Internet: URL: http://www.3gpp.org/ftp/tsg_ran/WG1_RL1/TSGR1_83/Docs/ [retrieved on Nov. 7, 2015] Sect. 3.
Qualcomm Incorporated: "PUSCH Design Options", 3GPP TSG RAN WG1 #83, R1-157023, Nov. 15, 2015, XP051003326, Retrieved from the Internet: URL:http://www.3gpp.org/ftp/Meetings_3GPP_SYNC/RAN1/Docs/, 4 pages.
Smee J.E, "5G Design Across Services," May 12, 2015 (May 12, 2015), XP055299081, Retrieved from the Internet: URL: https://johannesbergsummit.com/wp-content/uploads/sites/6/2014/11/Tuesday_3_John -Smee.pdf [retrieved on Aug. 31, 2016].

\* cited by examiner

COMMUNICATION OF UPLINK CONTROL INFORMATION

CROSS-REFERENCE TO RELATED APPLICATIONS

This application is a continuation application of U.S. Non-Provisional application Ser. No. 15/338,012, entitled "COMMUNICATION OF UPLINK CONTROL INFORMATION" filed on Oct. 28, 2016, which claims priority to and the benefit of U.S. Provisional Application Ser. No. 62/280,889, entitled "CODED UPLINK ACKNOWLEDGEMENT WITH SYSTEMATIC BITS IN SELF-CONTAINED SUBFRAME AND MORE CODED BITS IN UPLINK-CENTRIC SUBFRAME" filed on Jan. 20, 2016 and U.S. Provisional Application Ser. No. 62/302,284, entitled "COMMUNICATION OF UPLINK CONTROL INFORMATION OVER MULTIPLE SUBFRAMES" filed on Mar. 2, 2016, the entire contents of which are incorporated herein by reference.

BACKGROUND

Field

The present disclosure relates generally to communication systems, and more particularly, to transmitting and receiving acknowledgement information in a wireless communication system and communicating uplink control information over multiple subframes.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standard include Long Term Evolution (LTE) and LTE-Advanced (LTE-A), which include a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. However, as the demand for mobile broadband access continues to increase, there exists a need for further improvements in multiple access technologies technology. Preferably, these improvements should be applicable to existing and developing multi-access technologies and the telecommunication standards that employ such technologies.

SUMMARY

Embodiments disclosed herein provide systems, methods and apparatuses for communicating uplink control information over multiple subframes in a wireless communication network.

In an aspect of the disclosure, a communication device configured to communicate in a wireless network includes a transceiver and a processing circuit coupled to the transceiver. The processing circuit is configured to receive a first indication to use multiple subframes to send uplink control information, code the uplink control information over the multiple subframes as a result of receiving the first indication, and send the coded uplink control information via the multiple subframes. The processing circuit may further be configured to receive a second indication to code the uplink control information over the multiple subframes and code the uplink control information over the multiple subframes as a result of receiving the second indication.

According to certain aspects of the disclosure, the multiple subframes are consecutive subframes. The uplink control information may include physical uplink control channel (PUCCH) information. Additionally or alternatively, the uplink control information may include channel quality information, precoding matrix information, a scheduling request, acknowledgement information, and/or beam quality information. The channel quality information may include one or more combinations of signal to noise ratio (SNR), signal to interference plus noise ratio (SINR), reference signal received power (RSRP), reference signal received quality (RSRQ), and received signal strength indicator (RSSI).

The processing circuit configured to send the coded uplink control information is configured to transmit acknowledgement information of a current downlink-centric self-contained subframe in an uplink acknowledgement portion of the current downlink-centric self-contained subframe, bundle acknowledgement information bits of multiple downlink-centric self-contained subframes and encode the bundled acknowledgement information bits to generate parity acknowledgement bits associated with systematic acknowledgement bits, transmit the systematic acknowledgement bits in each uplink acknowledgement portion of the multiple downlink-centric self-contained subframes, and transmit the parity acknowledgement bits associated with the acknowledgement information bits of the multiple downlink-centric self-contained subframes in an uplink-centric self-contained subframe that is sequentially subsequent to the multiple downlink-centric self-contained subframes. The parity acknowledgement bits are transmitted in a data portion of the uplink-centric self-contained subframe.

The processing circuit configured to receive the first indication is configured to receive downlink control information in a control portion of a downlink-centric self-contained subframe that is sequentially prior to the multiple downlink-centric self-contained subframes, wherein the downlink control information indicates a data portion of the sequentially prior downlink-centric self-contained subframe for receiving data information and one or more acknowledgement portions of the multiple downlink-centric self-contained subframes for transmitting the acknowledgement information.

The processing circuit is further configured to detect whether the data information was correctly received in the data portion of the sequentially prior downlink-centric self-contained subframe and generate the acknowledgement information based on the detection, the acknowledgement information indicating whether the data information was correctly received and whether to schedule a hybrid automatic repeat request (HARQ) retransmission.

In another aspect of the disclosure, a method of wireless communication at a communication device includes receiving a first indication to use multiple subframes to send uplink control information, code the uplink control information over the multiple subframes a result of receiving the first indication, and sending the coded uplink control information via the multiple subframes. The sending the coded uplink control information may include transmitting acknowledgement information of a current downlink-centric self-contained subframe in an uplink acknowledgement portion of the current downlink-centric self-contained subframe, bundling acknowledgement information bits of multiple downlink-centric self-contained subframes and encoding the bundled acknowledgement information bits to generate parity acknowledgement bits associated with systematic acknowledgement bits, transmitting the systematic acknowledgement bits in each uplink acknowledgement portion of the multiple downlink-centric self-contained subframes, and transmitting the parity acknowledgement bits associated with the acknowledgement information bits of the multiple downlink-centric self-contained subframes in an uplink-centric self-contained subframe that is sequentially subsequent to the multiple downlink-centric self-contained subframes.

In a further aspect of the disclosure, a communication device configured to communicate in a wireless network includes means for receiving a first indication to use multiple subframes to send uplink control information, means for coding the uplink control information over the multiple subframes as a result of receiving the first indication, and means for sending the coded uplink control information via the multiple subframes. The means for sending the uplink control information may include means for transmitting acknowledgement information of a current downlink-centric self-contained subframe in an uplink acknowledgement portion of the current downlink-centric self-contained subframe, means for bundling acknowledgement information bits of multiple downlink-centric self-contained subframes and encoding the bundled acknowledgement information bits to generate parity acknowledgement bits associated with systematic acknowledgement bits, means for transmitting the systematic acknowledgement bits in each uplink acknowledgement portion of the multiple downlink-centric self-contained subframes, and means for transmitting the parity acknowledgement bits associated with the acknowledgement information bits of the multiple downlink-centric self-contained subframes in an uplink-centric self-contained subframe that is sequentially subsequent to the multiple downlink-centric self-contained subframes.

In another aspect of the disclosure, a processor-readable storage medium having one or more instructions which, when executed by at least one processing circuit, cause the at least one processing circuit to receive a first indication to use multiple subframes to send uplink control information, code the uplink control information over the multiple subframes as a result of receiving the first indication, and send the coded uplink control information via the multiple subframes. The one or more instructions, when executed by the at least one processing circuit, may further cause the at least one processing circuit to transmit acknowledgement information of a current downlink-centric self-contained subframe in an uplink acknowledgement portion of the current downlink-centric self-contained subframe, bundle acknowledgement information bits of multiple downlink-centric self-contained subframes and encode the bundled acknowledgement information bits to generate parity acknowledgement bits associated with systematic acknowledgement bits, transmit the systematic acknowledgement bits in each uplink acknowledgement portion of the multiple downlink-centric self-contained subframes, and transmit the parity acknowledgement bits associated with the acknowledgement information bits of the multiple downlink-centric self-contained subframes in an uplink-centric self-contained subframe that is sequentially subsequent to the multiple downlink-centric self-contained subframes.

In an aspect of the disclosure, a communication device configured to communicate in a wireless network includes a transceiver and a processing circuit coupled to the transceiver. The processing circuit is configured to detect that a user equipment (UE) is to use multiple subframes to send uplink control information and send an indication of the detection that the UE is to use the multiple subframes to send the uplink control information.

The processing circuit is further configured to detect that the UE is to code the uplink control information over the multiple subframes and send, to the UE, an indication of the detection that the UE is to code the uplink control information over the multiple subframes.

The processing circuit configured to detect may be configured to detect a link gain associated with the UE, and detect, based on the link gain, whether the UE is to use the multiple subframes. The processing circuit configured to detect the link gain may be configured to receive random access channel information from the UE, and calculate the link gain based on the random access channel information. The processing circuit configured to detect the link gain may be configured to receive channel quality information (CQI) feedback from the UE in a previous subframe, and calculate the link gain based on the CQI feedback received in the previous subframe.

The processing circuit configured to detect may be configured to detect a payload size of the uplink control information of the UE, and detect, based on the payload size of the uplink control information, whether the UE is to use the multiple subframes. The processing circuit configured to detect may also be configured to detect a link gain associated with the UE and a payload size of the uplink control information of the UE, and detect, based on the link gain and the payload size of the uplink control information, whether the UE is to use the multiple subframes.

The processing circuit configured to detect may be configured to detect an angle of arrival associated with the UE, and detect, based on the angle of arrival, at least one group of UEs that will be scheduled together to transmit simultaneously in a set of subframes. The processing circuit configured to detect the angle of arrival may be configured to receive directional random access channel information from the UE, and calculate the angle of arrival based on the directional random access channel information. The processing circuit configured to detect the angle of arrival may be configured to receive channel quality information (CQI)

feedback from the UE in a previous subframe, and detect the angle of arrival based on the CQI feedback received in the previous subframe.

The processing circuit is further configured to receive systematic bits associated with acknowledgement information in each of multiple downlink-centric self-contained subframes to enable immediate hybrid automatic repeat request (HARQ) scheduling, receive parity bits associated with the acknowledgement information in an uplink-centric self-contained subframe that is sequentially subsequent to the multiple downlink-centric self-contained subframes, process the received systematic bits jointly with the received parity bits to decode the systematic bits, recover the acknowledgement information based on the decoded systematic bits to detect whether a NACK-to-ACK error has occurred with respect to the acknowledgement information in a downlink-centric self-contained subframe, and retransmit a lost data packet associated with the NACK-to-ACK error at a medium access control (MAC) or higher layer.

The processing circuit is configured to receive the systematic bits in an uplink acknowledgement portion of each of the multiple downlink-centric self-contained subframes. The processing circuit is configured to receive the parity bits in a data portion of the uplink-centric self-contained subframe.

The processing circuit is further configured to transmit, to the UE, downlink control information in a control portion of a downlink-centric self-contained subframe that is sequentially prior to the multiple downlink-centric self-contained subframes, wherein the downlink control information indicates a data portion of the sequentially prior downlink-centric self-contained subframe for transmitting data information to the UE and one or more acknowledgement portions of the multiple downlink-centric self-contained subframes for receiving the acknowledgement information from the UE. The processing circuit is further configured to transmit, to the UE, the data information in the data portion of the sequentially prior downlink-centric self-contained subframe, wherein the acknowledgement information indicates whether the data information was correctly received by the UE.

In another aspect of the disclosure, a method of wireless communication at a communication device, includes detecting that a user equipment (UE) is to use multiple subframes to send uplink control information and sending an indication of the detection to the UE. The method further includes receiving systematic bits associated with acknowledgement information in each of multiple downlink-centric self-contained subframes to enable immediate hybrid automatic repeat request (HARQ) scheduling, receiving parity bits associated with the acknowledgement information in an uplink-centric self-contained subframe that is sequentially subsequent to the multiple downlink-centric self-contained subframes, processing the received systematic bits jointly with the received parity bits to decode the systematic bits, recovering the acknowledgement information based on the decoded systematic bits to detect whether a NACK-to-ACK error has occurred with respect to the acknowledgement information in a downlink-centric self-contained subframe, and retransmitting a lost data packet associated with the NACK-to-ACK error at a medium access control (MAC) or higher layer. The method also includes transmitting, to the UE, downlink control information in a control portion of a downlink-centric self-contained subframe that is sequentially prior to the multiple downlink-centric self-contained subframes, wherein the downlink control information indicates a data portion of the sequentially prior downlink-centric self-contained subframe for transmitting data information to the UE and one or more acknowledgement portions of the multiple downlink-centric self-contained subframes for receiving the acknowledgement information from the UE, and transmitting, to the UE, the data information in the data portion of the sequentially prior downlink-centric self-contained subframe, wherein the acknowledgement information indicates whether the data information was correctly received by the UE.

In a further aspect of the disclosure, a communication device configured to communicate in a wireless network includes means for detecting that a user equipment (UE) is to use multiple subframes to send uplink control information, means for sending an indication of the detection to the UE, means for receiving systematic bits associated with acknowledgement information in each of multiple downlink-centric self-contained subframes to enable immediate hybrid automatic repeat request (HARQ) scheduling, means for receiving parity bits associated with the acknowledgement information in an uplink-centric self-contained subframe that is sequentially subsequent to the multiple downlink-centric self-contained subframes, means for processing the received systematic bits jointly with the received parity bits to decode the systematic bits, means for recovering the acknowledgement information based on the decoded systematic bits to detect whether a NACK-to-ACK error has occurred with respect to the acknowledgement information in a downlink-centric self-contained subframe, means for retransmitting a lost data packet associated with the NACK-to-ACK error at a medium access control (MAC) or higher layer, means for transmitting, to the UE, downlink control information in a control portion of a downlink-centric self-contained subframe that is sequentially prior to the multiple downlink-centric self-contained subframes, wherein the downlink control information indicates a data portion of the sequentially prior downlink-centric self-contained subframe for transmitting data information to the UE and one or more acknowledgement portions of the multiple downlink-centric self-contained subframes for receiving the acknowledgement information from the UE, and means for transmitting, to the UE, the data information in the data portion of the sequentially prior downlink-centric self-contained subframe, wherein the acknowledgement information indicates whether the data information was correctly received by the UE.

In another aspect of the disclosure, a processor-readable storage medium having one or more instructions which, when executed by at least one processing circuit, cause the at least one processing circuit to detect that a user equipment (UE) is to use multiple subframes to send uplink control information, send an indication of the detection to the UE, receive systematic bits associated with acknowledgement information in each of multiple downlink-centric self-contained subframes to enable immediate hybrid automatic repeat request (HARQ) scheduling, receive parity bits associated with the acknowledgement information in an uplink-centric self-contained subframe that is sequentially subsequent to the multiple downlink-centric self-contained subframes, process the received systematic bits jointly with the received parity bits to decode the systematic bits, recover the acknowledgement information based on the decoded systematic bits to detect whether a NACK-to-ACK error has occurred with respect to the acknowledgement information in a downlink-centric self-contained subframe, retransmit a lost data packet associated with the NACK-to-ACK error at a medium access control (MAC) or higher layer, transmit, to the UE, downlink control information in a control portion of a downlink-centric self-contained subframe that is sequentially prior to the multiple downlink-centric self-contained subframes, wherein the downlink control information indicates a data portion of the sequentially prior downlink-centric self-contained subframe for transmitting data information to the UE and one or more acknowledgement portions of the multiple downlink-centric self-contained subframes for receiving the acknowledgement information from the UE, and transmit, to the UE, the data information in the data portion of the sequentially prior downlink-centric self-contained subframe, wherein the acknowledgement information indicates whether the data information was correctly received by the UE.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The various concepts presented throughout this disclosure may be implemented across a broad variety of telecommunication systems, network architectures, and communication standards.

Exemplary Operating Environment

Figure 1:
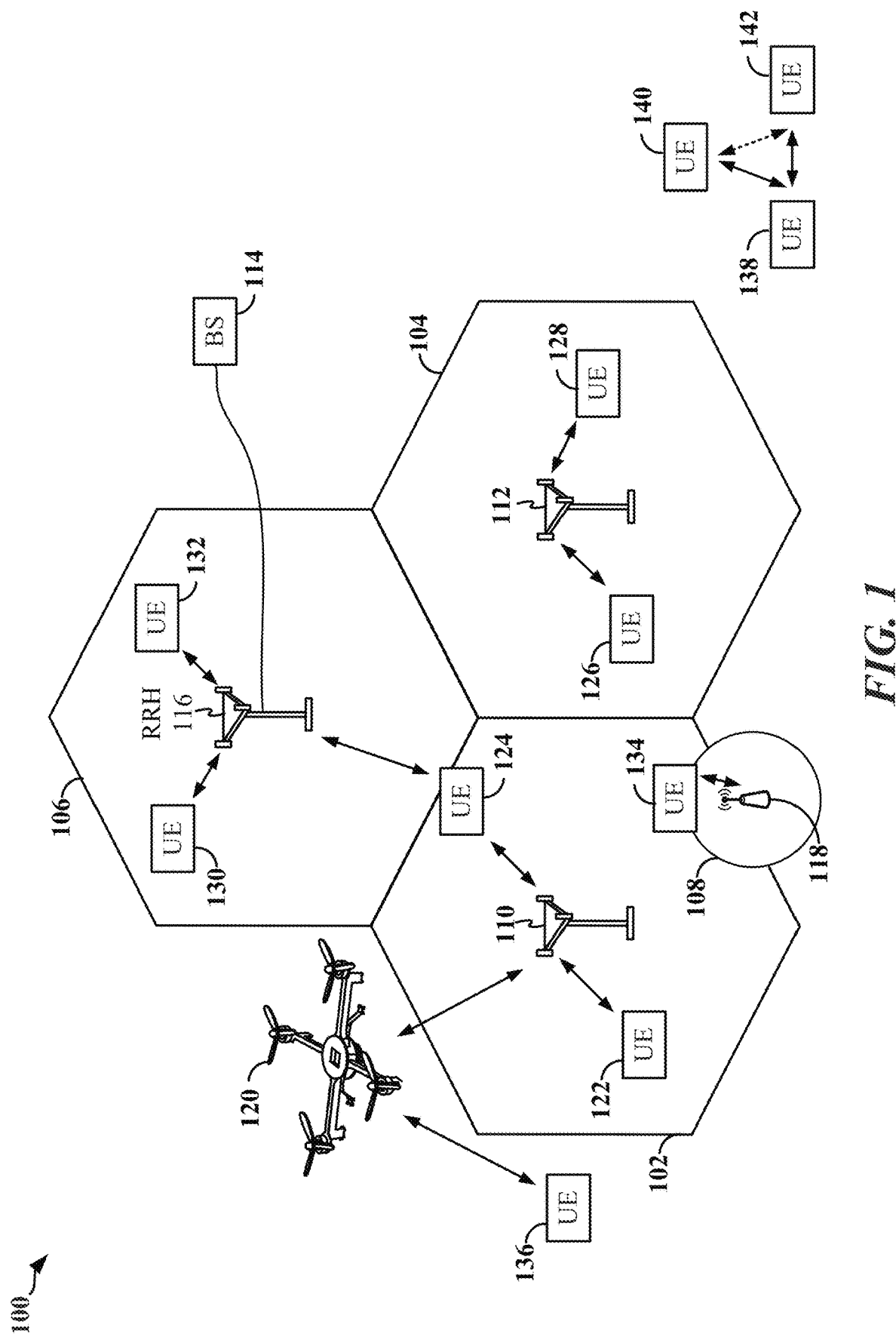
FIG. 1 is a diagram illustrating a simplified schematic example of an access network.

FIG. 1 is a diagram illustrating a simplified schematic example of an access network 100. The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, or some other suitable terminology.

In FIG. 1, two high-power base stations 110 and 112 are shown in cells 102 and 104, and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
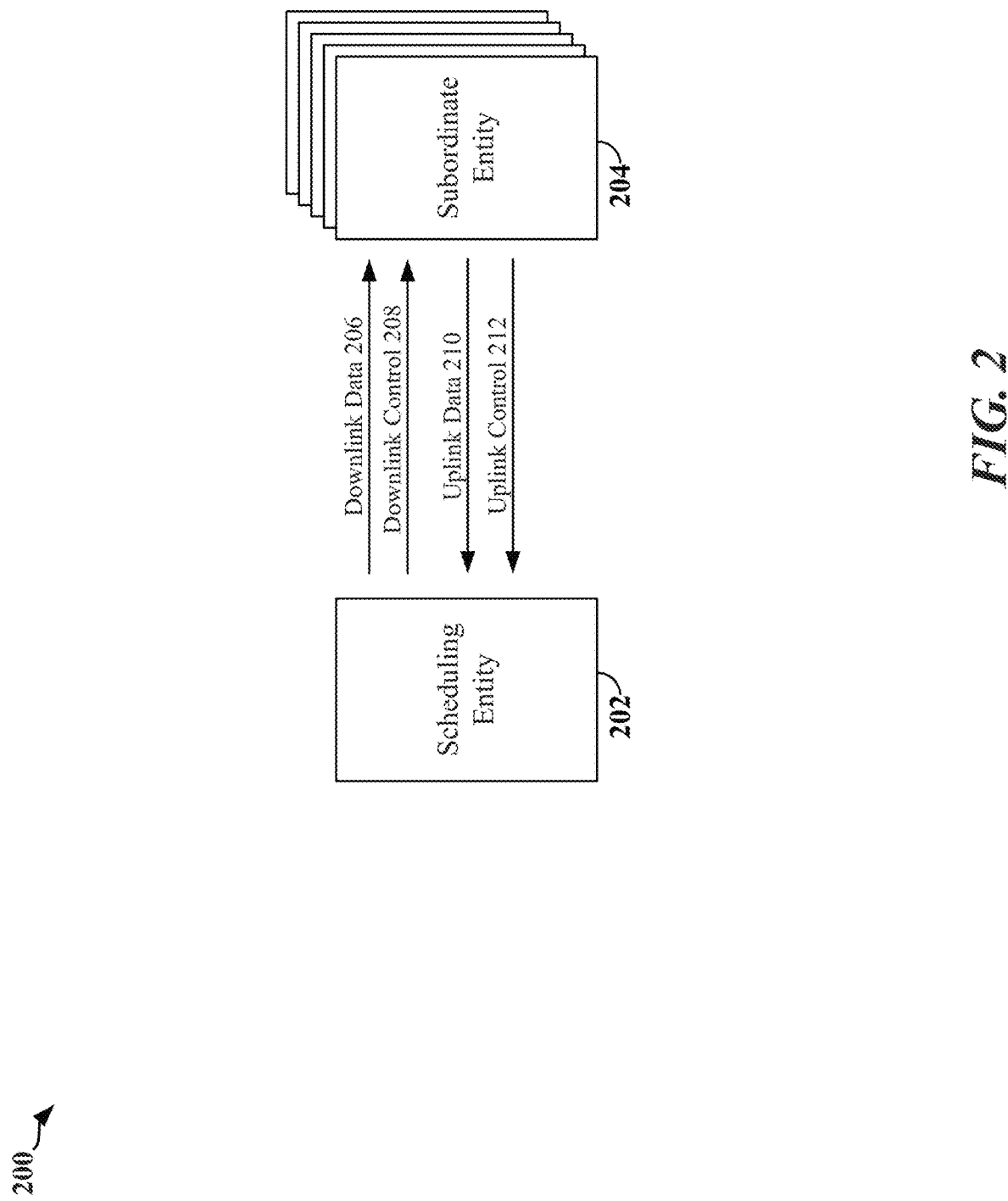
FIG. 2 is a block diagram conceptually illustrating an example of a scheduling entity communicating with one or more subordinate entities according to some embodiments.

Thus, in a wireless communication network with a scheduled access to time-frequency resources and having a cellular configuration, a P2P configuration, and a mesh configuration, a scheduling entity and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 to one or more subordinate entities 204. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
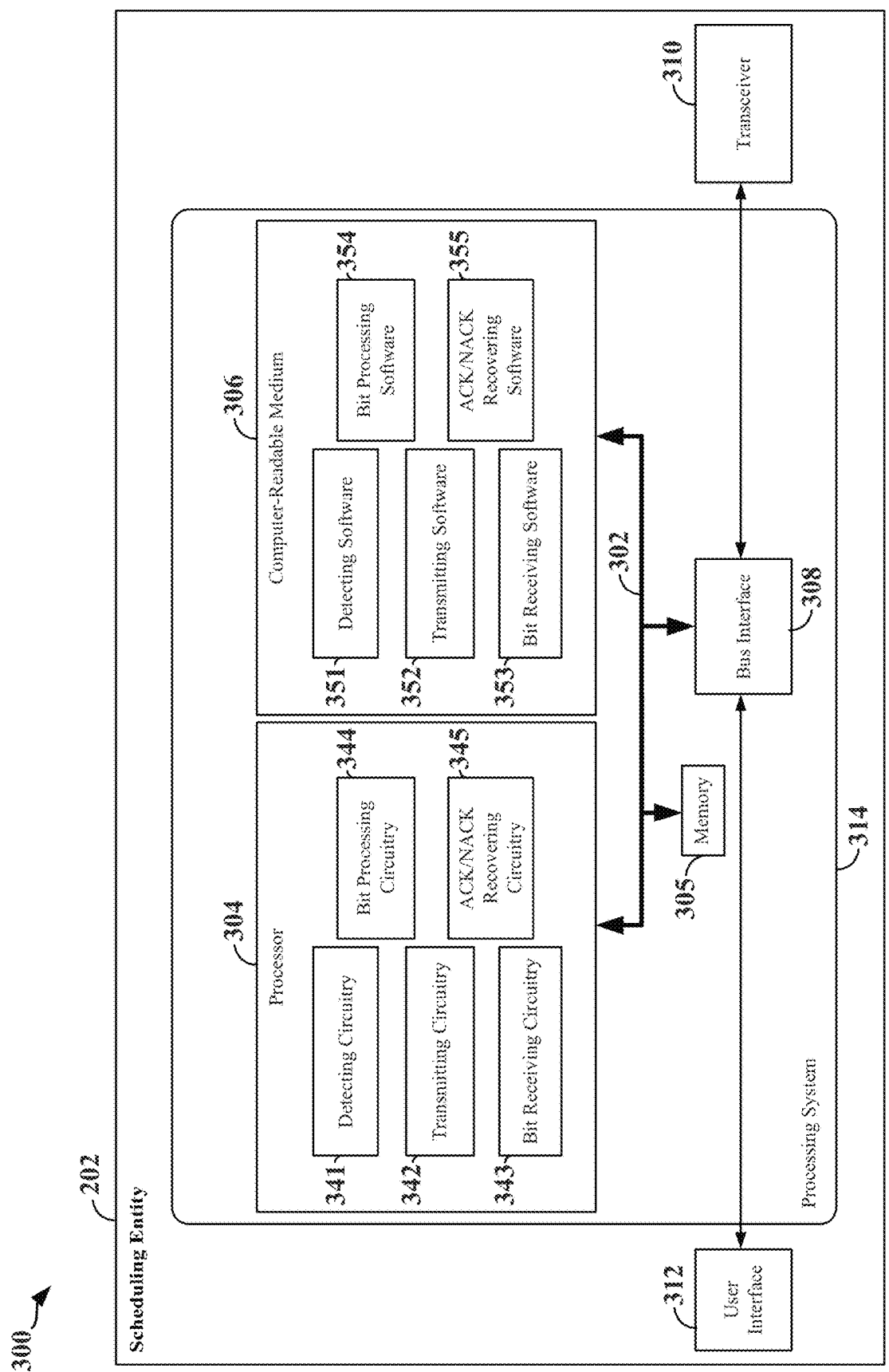
FIG. 3 is a conceptual diagram illustrating an example of a hardware implementation for an exemplary scheduling entity employing a processing system.

FIG. 3 is a conceptual diagram 300 illustrating an example of a hardware implementation for an exemplary scheduling entity 202 employing a processing system 314. In accordance with various aspects of the disclosure, an element, or any portion of an element, or any combination of elements may be implemented with a processing system 314 that includes one or more processors 304.

In various aspects of the disclosure, the scheduling entity 202 may be any suitable radio transceiver apparatus, and in some examples, may be embodied in a base station (BS), such as a base station 110 or a base station 118 of FIG. 1, a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE).

In other examples, the scheduling entity 202 may be embodied in a wireless UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 304, as utilized in a scheduling entity 202, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include detecting circuitry 341, configured to detect that a user equipment (UE) (or subordinate entity) is to use multiple subframes to send uplink control information or code uplink control information over multiple subframes. The detecting circuitry 341 may operate in coordination with detecting software 351. The processor 304 may further include transmitting circuitry 342, configured to send, to the UE, an indication of the detection that the UE is to use multiple subframes to send uplink information or code uplink control information over multiple subframes, transmit to the UE, downlink control information in a control portion of a downlink-centric self-contained subframe that is sequentially prior to multiple downlink-centric self-contained subframes, transmit, to the UE, data information in a data portion of the sequentially prior downlink-centric self-contained subframe, and/or retransmit a lost data packet associated with an NACK-to-ACK error at a medium access control (MAC) or higher layer. The transmitting circuitry 342 may operate in coordination with transmitting software 352. The processor 304 may further include bit receiving circuitry 343, configured to receive systematic bits associated with acknowledgement information in each of the multiple downlink-centric self-contained subframes to enable immediate hybrid automatic repeat request (HARQ) scheduling and receive parity bits associated with the acknowledgement information in an uplink-centric self-contained subframe that is sequentially subsequent to the multiple downlink-centric self-contained subframes. The bit receiving circuitry 343 may operate in coordination with bit receiving software 353. The processor 304 may further include bit processing circuitry 344, configured to process the received systematic bits jointly with the received parity bits to decode the systematic bits. The bit processing circuitry 344 may operate in coordination with bit processing software 354. The processor 304 may further include ACK/NACK recovering circuitry 345, configured to recover the acknowledgement information based on the decoded systematic bits to detect whether the NACK-to-ACK error has occurred with respect to the acknowledgment information in a downlink-centric self-contained subframe. The ACK/NACK recovering circuitry 345 may operate in coordination with ACK/NACK recovering software 355.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
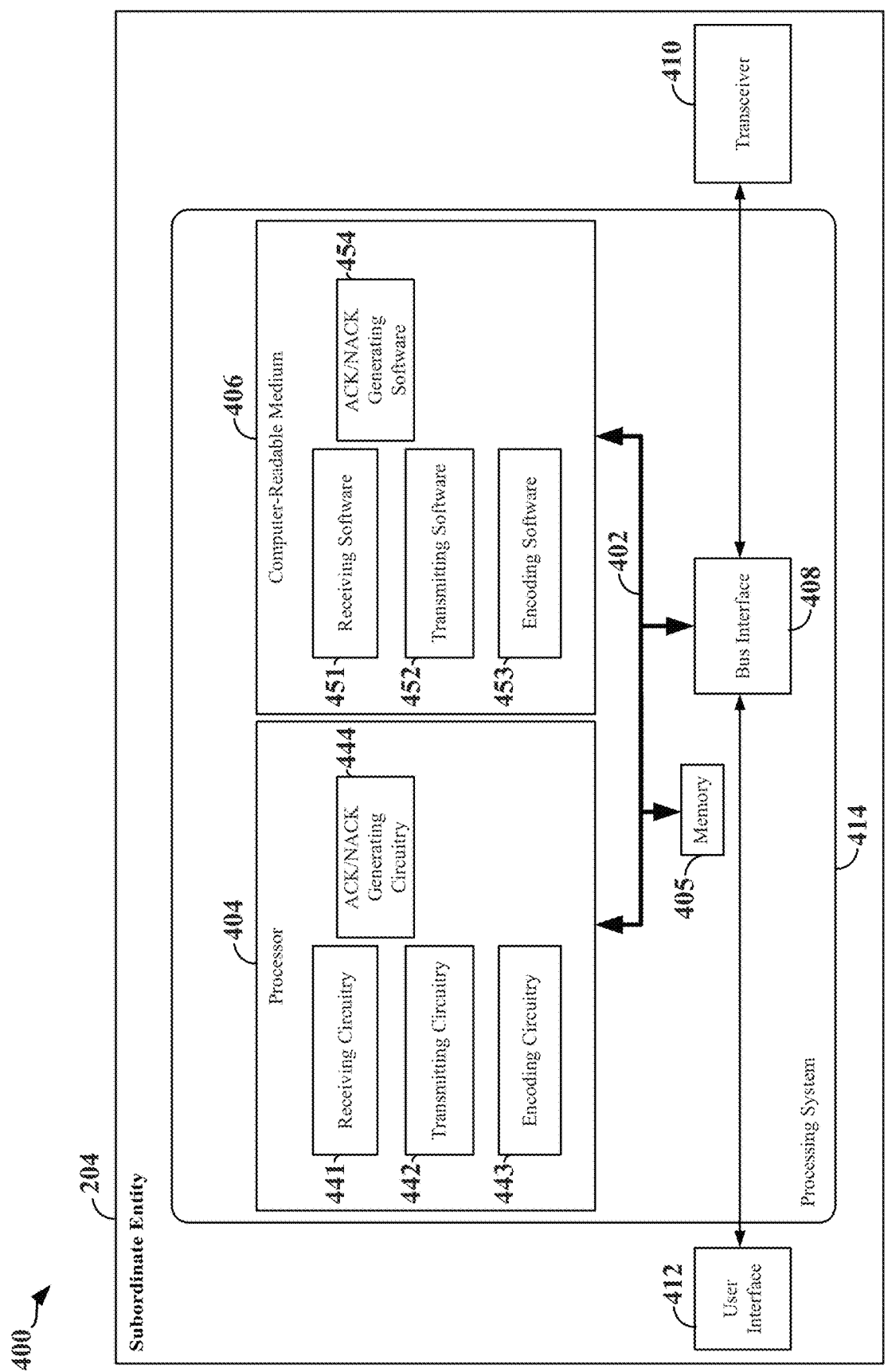
FIG. 4 is a conceptual diagram illustrating an example of a hardware implementation for an exemplary subordinate entity employing a processing system.

FIG. 4 is a conceptual diagram 400 illustrating an example of a hardware implementation for an exemplary subordinate entity 204 employing a processing system 414. In accordance with various aspects of the disclosure, an element, or any portion of an element, or any combination of elements may be implemented with a processing system 414 that includes one or more processors 404.

The processing system 414 may be substantially the same as the processing system 314 illustrated in FIG. 3, including a bus interface 408, a bus 402, memory 405, a processor 404, and a computer-readable medium 406. Furthermore, the subordinate entity 204 may include a user interface 412 and a transceiver 410 substantially similar to those described above in FIG. 3.

In some aspects of the disclosure, the processor 404 may include receiving circuitry 441, configured to receive a first indication to use multiple subframes to send uplink control information, receive a second indication to code the uplink control information over the multiple subframes, receive downlink control information in a control portion of a downlink-centric self-contained subframe that is sequentially prior to multiple downlink-centric self-contained subframes, and detect whether data information was correctly received in a data portion of the sequentially prior downlink-centric self-contained subframe. The receiving circuitry 441 may operate in coordination with receiving software 451. The processor 404 may further include transmitting circuitry 442, configured to send the uplink control information via the multiple subframes as a result of receiving the first indication, transmit systematic acknowledgement bits in each uplink acknowledgement portion of the multiple downlink-centric self-contained subframes, and transmit parity acknowledgement bits associated with acknowledgement information bits of the multiple downlink-centric self-contained subframes in an uplink-centric self-contained subframe that is sequentially subsequent to the multiple downlink-centric self-contained subframes. The transmitting circuitry 442 may operate in coordination with transmitting software 452. The processor 404 may also include encoding circuitry 443, configured to code the uplink control information over the multiple subframes as a result of receiving the second indication, bundle acknowledgement information bits of the multiple downlink-centric self-contained subframes, and encode the bundled acknowledgement information bits to generate the parity acknowledgement bits associated with the systematic acknowledgement bits. The encoding circuitry 443 may operate in coordination with encoding software 453. The processor 404 may further include ACK/NACK generating circuitry 444, configured to generate the acknowledgement information based on the detection of whether the data information was correctly received and transmit the acknowledgement information of a current downlink-centric self-contained subframe in an uplink acknowledgement portion of the current downlink-centric self-contained subframe. The ACK/NACK generating circuitry 444 may operate in coordination with ACK/NACK generating software 454.

Figure 5:
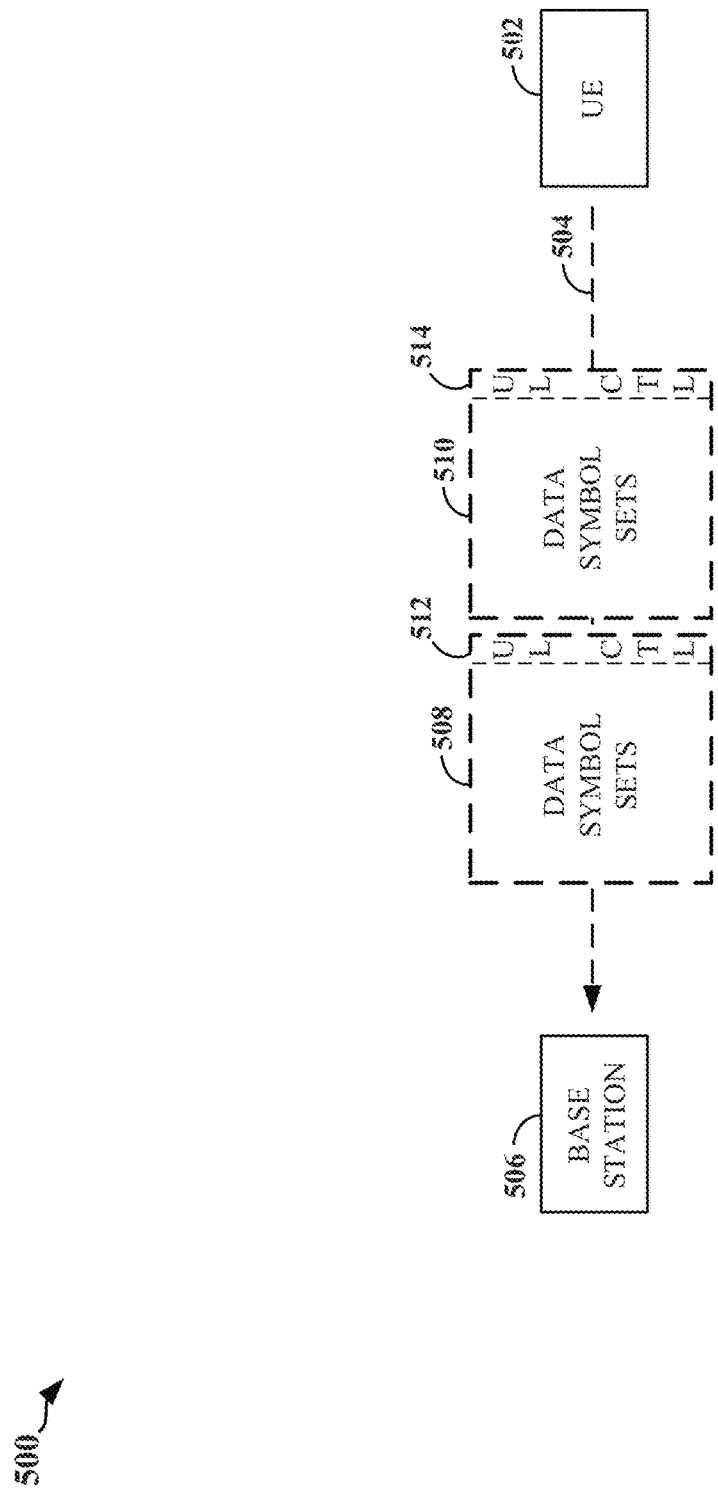
FIG. 5 illustrates a communication system where a UE sends uplink information to a base station.

Exemplary Description of Communicating Uplink Control Information Over Multiple Subframes FIG. 5 illustrates a communication system 500 where a UE 502 sends uplink information 504 to a base station 506. As represented by a first subframe 508 and a second subframe 510, the UE 502 may send UL control information (UL CTL) via multiple subframes. For example, a first set of UL CTL bits 512 may be sent in the first subframe 508 and a second set of UL CTL bits 514 may be sent in the second subframe 510.

Example Subframe Structures

Figure 6:
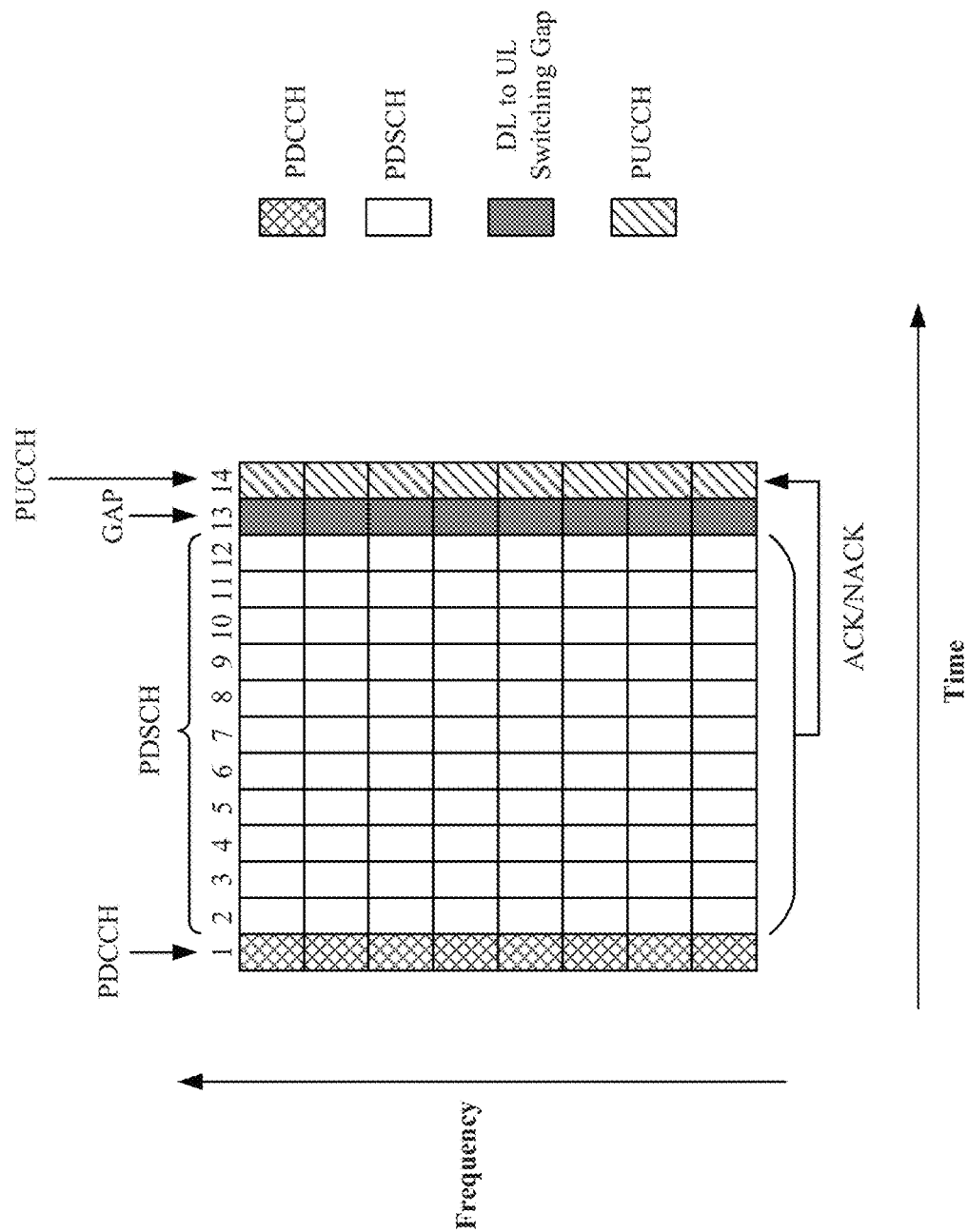
FIG. 6 illustrates an example of a self-contained downlink (DL) subframe structure.

FIG. 6 illustrates an example of a self-contained downlink (DL) subframe structure 600. The subframe structure 600 may include 14 symbols (indexed 1 through 14 in FIG. 6) spread across a time domain A BS may send control information, e.g., a physical downlink control channel (PDCCH) in a first symbol (symbol index 1). The BS may send data, e.g., a physical downlink shared channel (PDSCH) in a second symbol through a twelfth symbol (symbol indices 2 to 12). A thirteenth symbol (symbol index 13) may represent a gap where the subframe structure 600 switches from facilitating downlink transmissions to facilitating uplink transmissions. Accordingly, a UE may send acknowledgement information (ACK/NACK), for data received in the second symbol through the twelfth symbol, in a fourteenth symbol (symbol index 14) via a physical uplink control channel (PUCCH).

Figure 7:
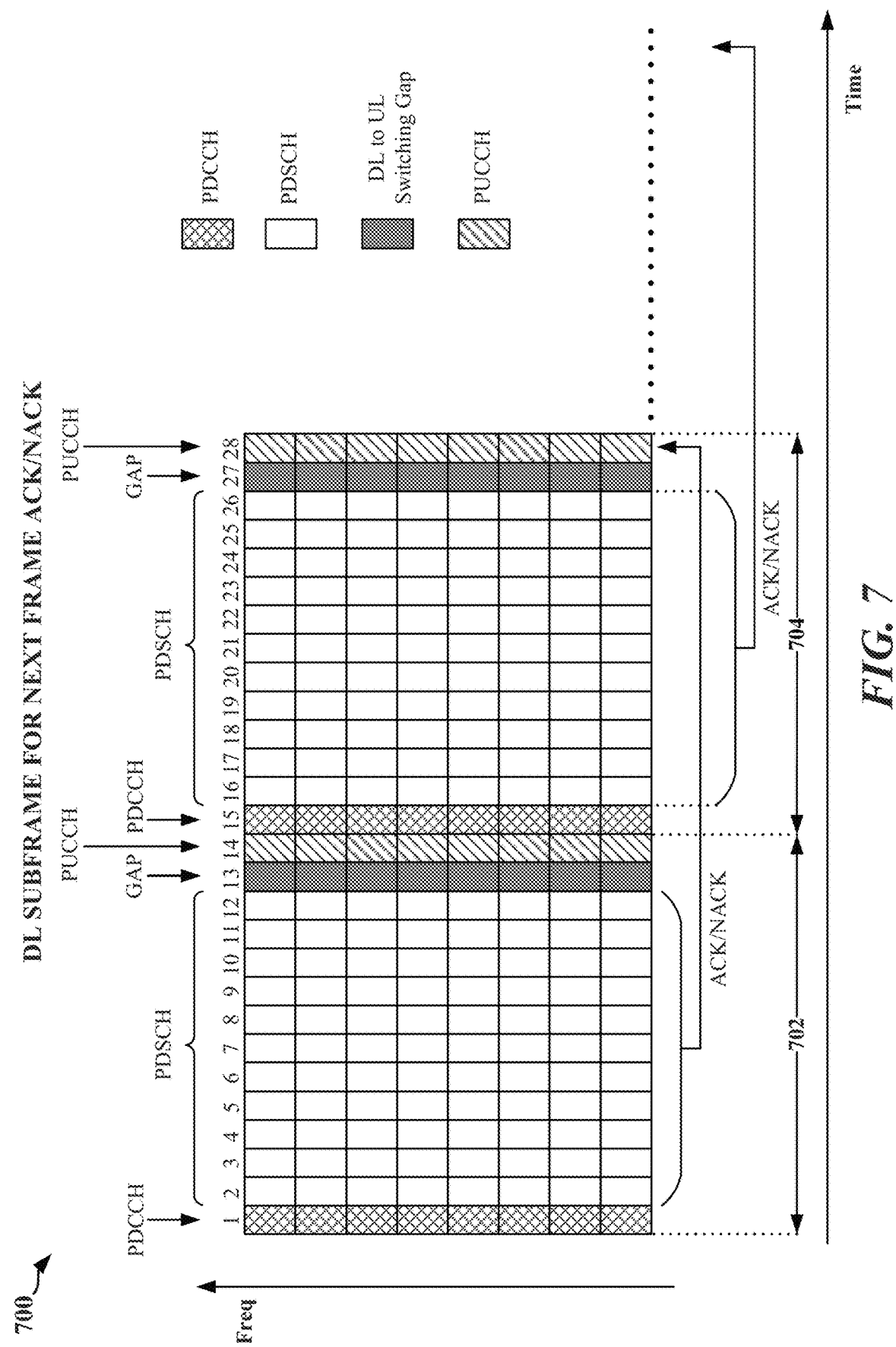
FIG. 7 illustrates an example of a subframe structure that facilitates sending acknowledgement information (ACK/NACK) in a subsequent subframe.

FIG. 7 illustrates an example of a subframe structure 700 that facilitates sending acknowledgement information (ACK/NACK) in a subsequent subframe. The subframe structure 700 includes at least two consecutive subframes, e.g., at least a first subframe 702 and a second subframe 704. The first subframe 702 includes 14 symbols (indexed 1 through 14 in FIG. 7) spread across a time domain. The second subframe 704 also includes 14 symbols (indexed 15 through 28 in FIG. 7) spread across the time domain.

In an aspect of the disclosure, certain types of UEs (e.g., category 0 UEs) may not be able to generate/send acknowledgement information (ACK/NACK) within one symbol. For example, a UE may not be able to send ACK/NACK, for PDSCH data received in the first subframe 702, in the last symbol (symbol index 14) of the first subframe 702. Accordingly, this type of UE may send the ACK/NACK in the next subframe, e.g., send the ACK/NACK in the last symbol (symbol index 28) of the second subframe 704. Similarly, if the UE is not able to send ACK/NACK, for PDSCH data received in the second subframe 704, in the last symbol (symbol index 28) of the second subframe 704, then the UE may send the ACK/NACK in a symbol of a subsequent subframe.

Issue with One Symbol for UL Control

Figure 8:
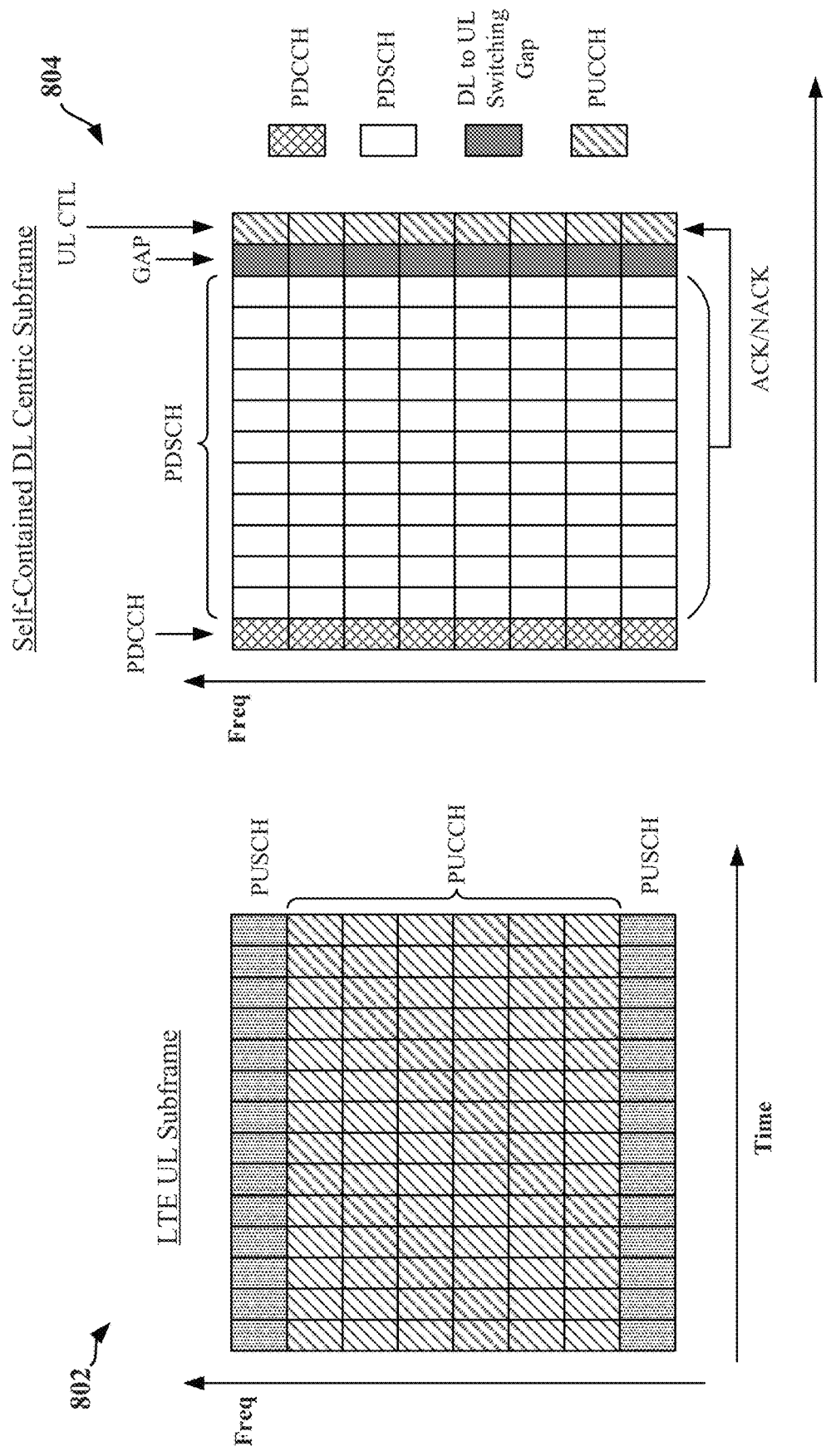
FIG. 8 is a diagram illustrating an LTE uplink (UL) subframe and a self-contained downlink (DL) centric subframe.

FIG. 8 is a diagram 800 illustrating an LTE uplink (UL) subframe 802 and a self-contained downlink (DL) centric subframe 804. In an LTE system, PUCCH (e.g., 10 bits of channel quality information (CQI)) is transmitted over 14 symbols, as shown in the LTE UL subframe structure 802. This allows UEs to transmit power over a longer duration. However, in the self-contained DL centric subframe structure 804, uplink control (UL CTL) information (or PUCCH) may only be transmitted in the last symbol (as shown in FIG. 8) or the last two symbols (not shown). Consequently, cell edge UEs utilizing the self-contained DL centric subframe structure 804 may not have sufficient link budget to meet CQI transmission requirements within a single symbol or within two symbols.

Transmission of Uplink Control Information Over Multiple Subframes

Figure 9:
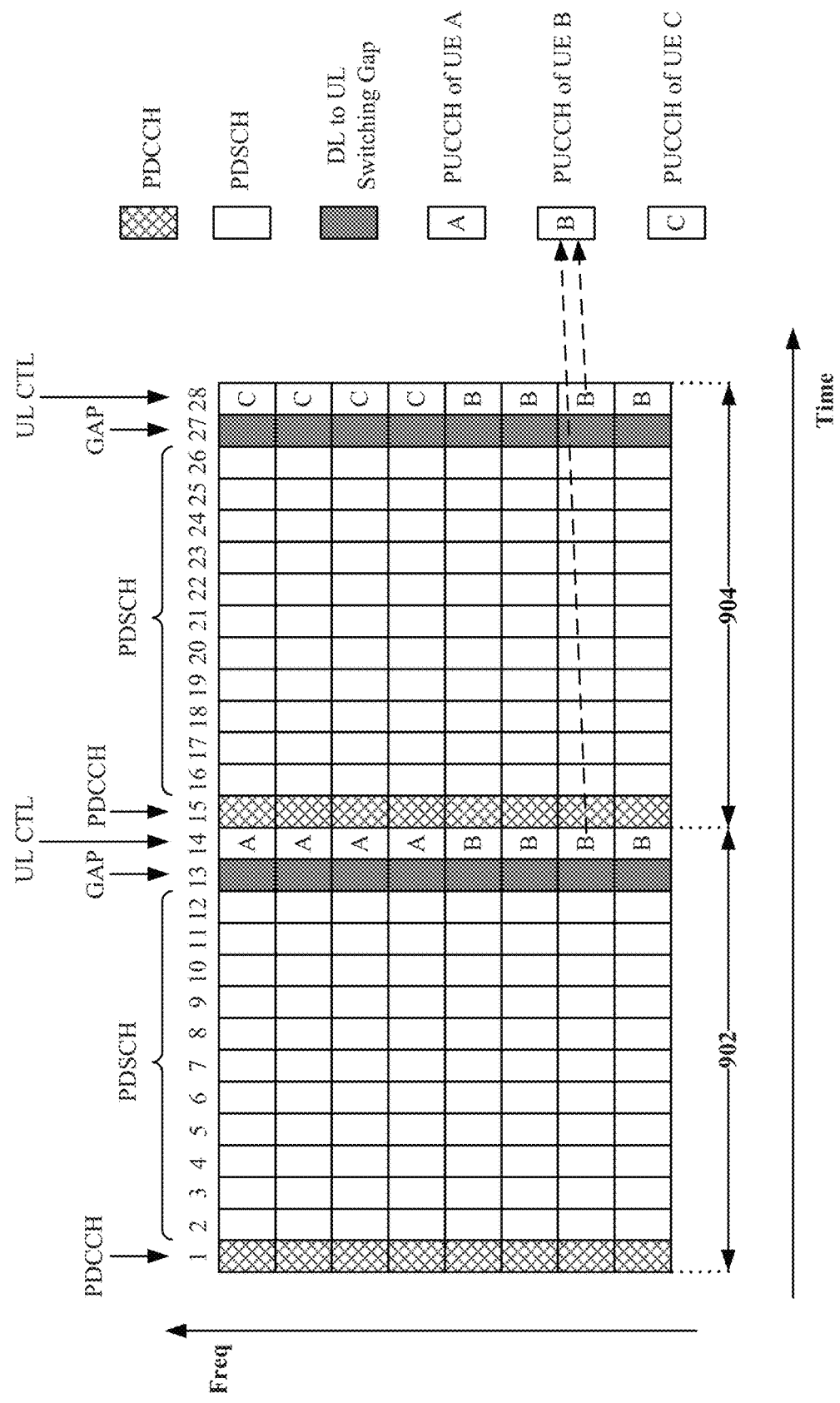
FIG. 9 illustrates an example of a subframe structure that facilitates transmitting uplink control information over multiple subframes.

FIG. 9 illustrates an example of a subframe structure 900 that facilitates transmitting uplink control information over multiple subframes. The subframe structure 900 includes at least two consecutive subframes, e.g., at least a first subframe 902 and a second subframe 904. The first subframe 902 includes 14 symbols (indexed 1 through 14 in FIG. 9) spread across a time domain. The second subframe 904 also includes 14 symbols (indexed 15 through 28 in FIG. 9) spread across the time domain. In an aspect of the disclosure, the subframe structure 900 includes at least two uplink control (UL CTL) symbols, e.g., the last symbol (symbol index 14) of the first subframe 902 and the last symbol (symbol index 28) of the second subframe 904.

The subframe structure 900 allows for channel quality information (CQI) and other forms of PUCCH to be collected over multiple subframes (e.g., for UEs with a low signal-to-noise ratio (SNR)). For example, a UE B may send uplink control information via PUCCH in the last symbol (symbol index 14) of the first subframe 902 and the last symbol of the (symbol index 28) of the second subframe 904. Moreover, the subframe structure 900 still allows UEs with high SNR to transmit CQI over one subframe. For example, a UE A may send uplink control information via PUCCH in the last symbol (symbol index 14) of the first subframe 902. In another example, a UE C may send uplink control information via PUCCH in the last symbol (symbol index 28) of the second subframe 904. This allows cell edge UEs to achieve similar performance as LTE while in the context of a self-contained downlink centric subframe structure.

In view of the above, in some aspects of the disclosure, a base station (BS) may explicitly inform a set of UEs to occupy PUCCH resources over multiple subframes, and, in response, UEs of those sets may transmit PUCCH over multiple subframes. In some aspects of the disclosure, the BS may select the UEs based on a link gain of the UEs. In some aspects of the disclosure, the BS may select the UEs based on an angle of arrival of the UEs' signal to the BS. In some aspects of the disclosure, the BS learns the angle of arrival of the UEs while receiving directional random access channel (DRACH) information from the UEs. In some aspects of the disclosure, a BS may signal a UE to use coding over multiple subframes.

Figure 10:
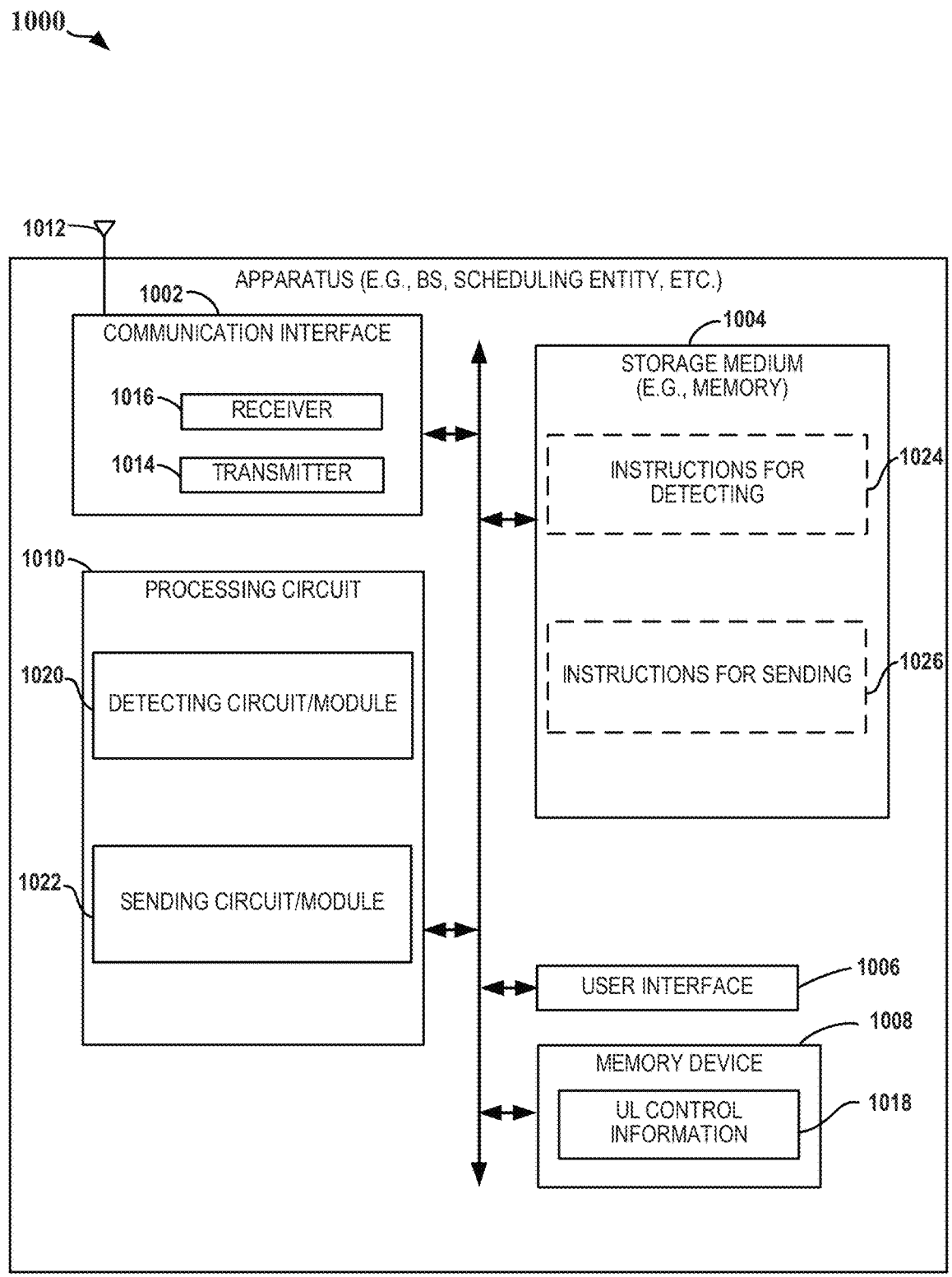
FIG. 10 illustrates a block diagram of an example hardware implementation of an apparatus configured to communicate according to one or more aspects of the disclosure.

Exemplary Devices and Methods for Communicating Uplink Control Information Via Multiple Subframes FIG. 10 illustrates a block diagram of an example hardware implementation of an apparatus 1000 configured to communicate according to one or more aspects of the disclosure. The apparatus 1000 could embody or be implemented within a BS, a scheduling entity, a UE, a subordinate entity, or some other type of device that supports wireless communication. In various implementations, the apparatus 1000 could embody or be implemented within an access point, an access terminal, or some other type of device. In various implementations, the apparatus 1000 could embody or be implemented within a mobile phone, a smart phone, a tablet, a portable computer, a server, a personal computer, a sensor, an entertainment device, a medical device, or any other electronic device having circuitry.

The apparatus 1000 includes a communication interface (e.g., at least one transceiver) 1002, a storage medium 1004, a user interface 1006, a memory device (e.g., a memory circuit) 1008, and a processing circuit (e.g., at least one processor) 1010. In various implementations, the user interface 1006 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 provides a means for communicating with other apparatuses over a transmission medium. In some implementations, the communication interface 1002 includes circuitry and/or programming adapted to facilitate the communication of information bi-directionally with respect to one or more communication devices in a network. In some implementations, the communication interface 1002 is adapted to facilitate wireless communication of the apparatus 1000. In these implementations, the communication interface 1002 may be coupled to one or more antennas 1012 as shown in FIG. 10 for wireless communication within a wireless communication system. The communication interface 1002 can be configured with one or more standalone receivers and/or transmitters, as well as one or more transceivers. In the illustrated example, the communication interface 1002 includes a transmitter 1014 and a receiver 1016. The communication interface 1002 serves as one example of a means for receiving and/or means transmitting.

The memory device 1008 may represent one or more memory devices. As indicated, the memory device 1008 may maintain uplink control information 1018 along with other information used by the apparatus 1000. In some implementations, the memory device 1008 and the storage medium 1004 are implemented as a common memory component. The memory device 1008 may also be used for storing data that is manipulated by the processing circuit 1010 or some other component of the apparatus 1000.

The storage medium 1004 may represent one or more computer-readable, machine-readable, and/or processor-readable devices for storing programming, such as processor executable code or instructions (e.g., software, firmware), electronic data, databases, or other digital information. The storage medium 1004 may also be used for storing data that is manipulated by the processing circuit 1010 when executing programming. The storage medium 1004 may be any available media that can be accessed by a general purpose or special purpose processor, including portable or fixed storage devices, optical storage devices, and various other mediums capable of storing, containing or carrying programming.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory (e.g., tangible) storage medium.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the apparatus 1000, external to the apparatus 1000, distributed across multiple entities, etc.).

Programming stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols.

The processing circuit 1010 is generally adapted for processing, including the execution of such programming stored on the storage medium 1004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired programming provided by appropriate media in at least one example. For example, the processing circuit 1010 may be implemented as one or more processors, one or more controllers, and/or other structure configured to execute executable programming Examples of the processing circuit 1010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the apparatuses described herein. For example, the processing circuit 1010 may be configured to perform any of the steps, functions, and/or processes described with respect to FIG. 11. As used herein, the term "adapted" in relation to the processing circuit 1010 may refer to the processing circuit 1010 being one or more of configured, employed, implemented, and/or programmed to perform a particular process, function, operation and/or routine according to various features described herein.

Figure 11:
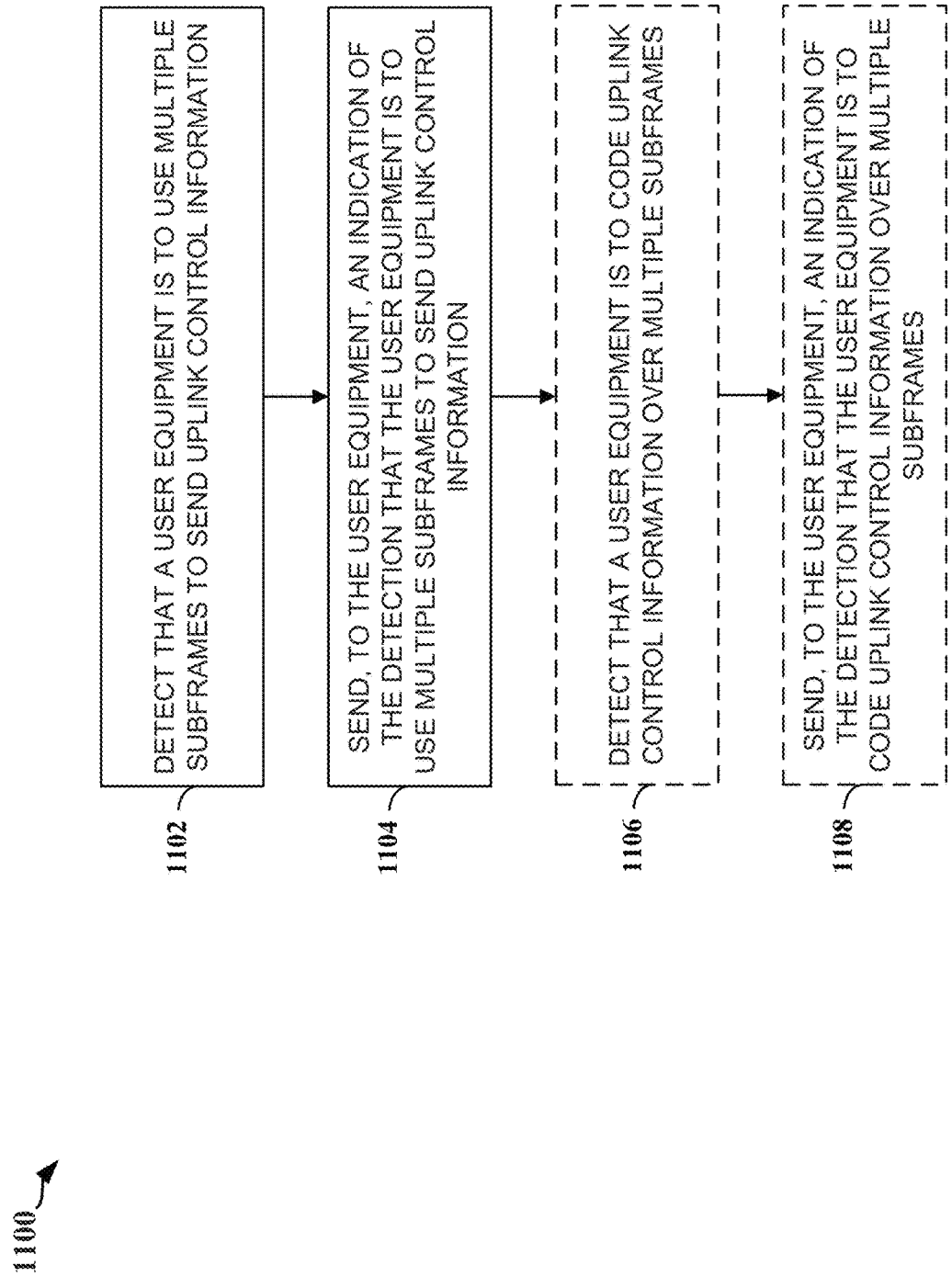
FIG. 11 illustrates a process for communication in accordance with some aspects of the disclosure.

The processing circuit 1010 may be a specialized processor, such as an application specific integrated circuit (ASIC) that serves as a means for (e.g., structure for) carrying out any one of the operations described in conjunction with FIG. 11. The processing circuit 1010 serves as one example of a means for transmitting and/or a means for receiving.

According to at least one example of the apparatus 1000, the processing circuit 1010 may include one or more of a detecting circuit/module 1020 for detecting that a user equipment (UE) (or subordinate entity) is to use multiple subframes to send uplink control information or code uplink control information over multiple subframes, or a sending circuit/module 1022 for sending, to the UE, an indication of the detection that the UE is to use multiple subframes to send uplink information or code uplink control information over multiple subframes.

As mentioned above, instructions/programming stored by the storage medium 1004, when executed by the processing circuit 1010, causes the processing circuit 1010 to perform one or more of the various functions and/or process operations described herein. For example, the instructions/programming, when executed by the processing circuit 1010, may cause the processing circuit 1010 to perform the various functions, steps, and/or processes described herein with respect to FIG. 11 in various implementations. As shown in FIG. 10, the storage medium 1004 may include one or more of the detecting instructions 1024, or the sending instructions 1026.

FIG. 11 illustrates a process 1100 for communication in accordance with some aspects of the disclosure. The process 1100 may take place within a processing circuit (e.g., the processor 1010 of FIG. 10), which may be located in a BS, a scheduling entity, a UE, a subordinate entity, or some other suitable apparatus. Of course, in various aspects within the scope of the disclosure, the process 1100 may be implemented by any suitable apparatus capable of supporting communication-related operations.

The apparatus (e.g., a BS or scheduling entity) detects that a user equipment (UE) is to use multiple subframes to send uplink control information 1102. The apparatus then sends, to the UE, an indication of the detection that the UE is to use multiple subframes to send uplink control information 1104.

In an aspect of the disclosure, the multiple subframes are consecutive subframes. In a further aspect of the disclosure, the uplink control information includes physical uplink control channel (PUCCH) information. The uplink control information may include channel quality information (CQI), precoding matrix information (PMI), a scheduling request, acknowledgement information (e.g., ACK or NACK), and/or beam quality information. The channel quality information may include one or more combinations of signal to noise ratio (SNR), signal to interference plus noise ratio (SINR), reference signal received power (RSRP), reference signal received quality (RSRQ), and received signal strength indicator (RSSI).

Additionally or alternatively, the apparatus may detect that the UE is to code uplink control information over multiple subframes 1106. Accordingly, the apparatus may send, to the UE, an indication of the detection that the UE is to code uplink control information over multiple subframes 1108.

In an aspect of the disclosure, the apparatus may detect (1102) that the UE is to use multiple subframes to send uplink control information by first detecting a link gain associated with the UE. Thereafter, the apparatus detects that the UE is to use multiple subframes to send the uplink control information based on the detected link gain.

The apparatus may detect the link gain associated with the UE by first receiving random access channel (RACH) information from the UE. Thereafter, the apparatus calculates the link gain based on the RACH information.

Additionally or alternatively, the apparatus may detect the link gain associated with the UE by first receiving channel quality information (CQI) feedback from the UE in a previous subframe. Thereafter, the apparatus detects the link gain based on the CQI feedback received in the previous subframe.

In an aspect of the disclosure, the apparatus may detect (1102) that the UE is to use multiple subframes to send uplink control information by first detecting a payload size of the uplink control information of the UE. Thereafter, the apparatus detects whether the UE is to use the multiple subframes based on the payload size of the uplink control information.

In an aspect of the disclosure, the apparatus may detect (1102) that the UE is to use multiple subframes to send uplink control information by detecting a link gain associated with the UE and detecting a payload size of the uplink control information of the UE. Thereafter, the apparatus detects whether the UE is to use the multiple subframes based on the link gain and the payload size of the uplink control information.

In an aspect of the disclosure, the apparatus may detect (1102) that the UE is to use multiple subframes to send uplink control information by first detecting an angle of arrival associated with the UE. Thereafter, the apparatus detects, based on the angle of arrival, at least one group of UEs that will be scheduled together to transmit simultaneously in a set of subframes.

The apparatus may detect the angle of arrival by first receiving directional random access channel (DRACH) information from the UE. Thereafter, the apparatus calculates the angle of arrival based on the DRACH information.

Additionally or alternatively, the apparatus may detect the angle of arrival by first receiving channel quality information (CQI) feedback from the UE in a previous subframe. Thereafter, the apparatus detects the angle of arrival based on the CQI feedback received in the previous subframe.

Figure 12:
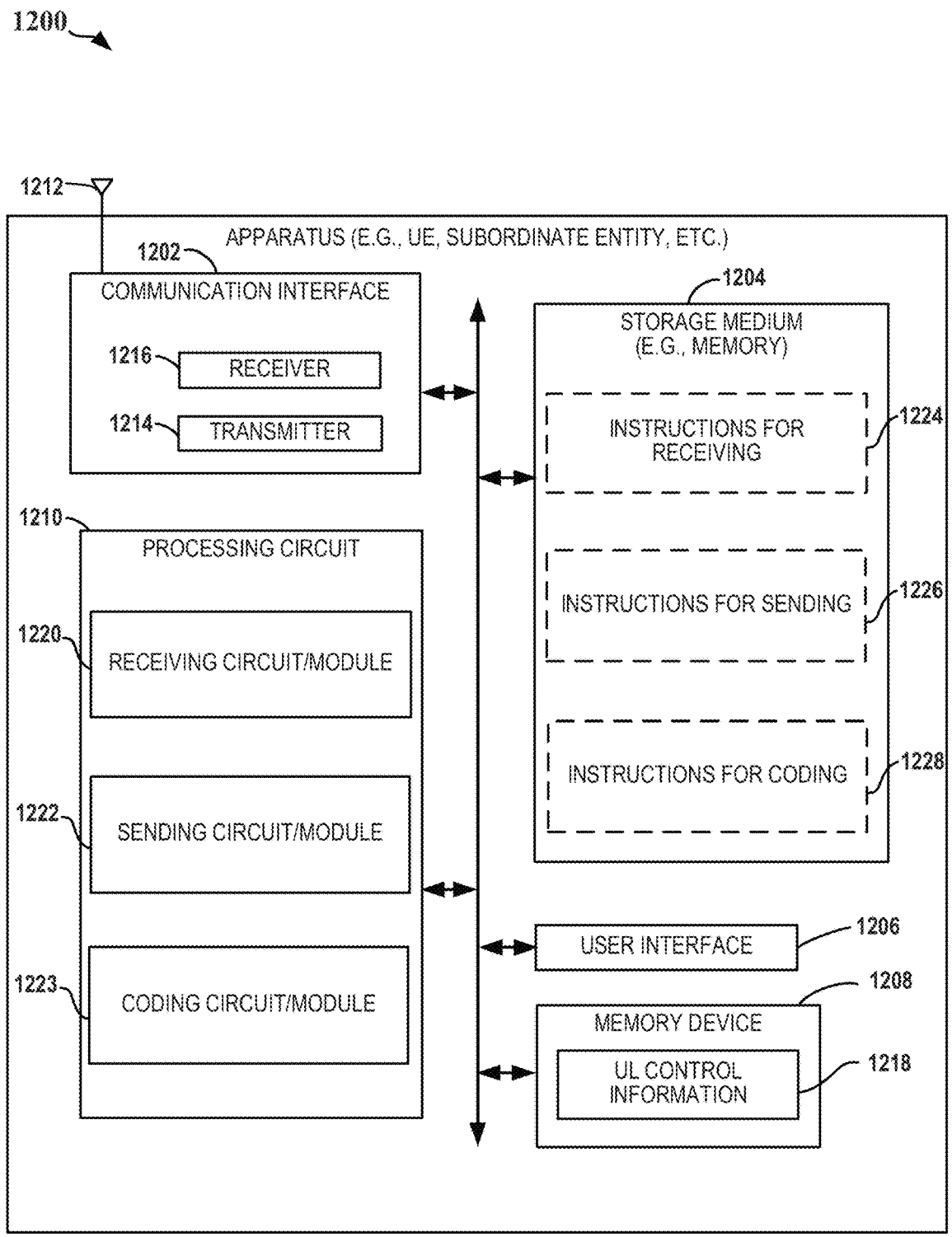
FIG. 12 illustrates a block diagram of an example hardware implementation of an apparatus configured to communicate according to one or more aspects of the disclosure.

FIG. 12 illustrates a block diagram of an example hardware implementation of an apparatus 1200 configured to communicate according to one or more aspects of the disclosure. The apparatus 1200 could embody or be implemented within a BS, a UE, a subordinate entity or some other type of device that supports wireless communication. In various implementations, the apparatus 1200 could embody or be implemented within an access terminal, an access point, or some other type of device. In various implementations, the apparatus 1200 could embody or be implemented within a mobile phone, a smart phone, a tablet, a portable computer, a server, a personal computer, a sensor, an entertainment device, a medical device, or any other electronic device having circuitry.

The apparatus 1200 includes a communication interface (e.g., at least one transceiver) 1202, a storage medium 1204, a user interface 1206, a memory device 1208 (e.g., storing uplink control information 1218), and a processing circuit (e.g., at least one processor) 1210. In various implementations, the user interface 1206 may include one or more of: a keypad, a display, a speaker, a microphone, a touchscreen display, of some other circuitry for receiving an input from or sending an output to a user. The communication interface 1202 may be coupled to one or more antennas 1212, and may include a transmitter 1214 and a receiver 1216. In general, the components of FIG. 12 may be similar to corresponding components of the apparatus 1000 of FIG. 10.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIG. 13. As used herein, the term "adapted" in relation to the processing circuit 1210 may refer to the processing circuit 1210 being one or more of configured, employed, implemented, and/or programmed to perform a particular process, function, operation and/or routine according to various features described herein.

Figure 13:
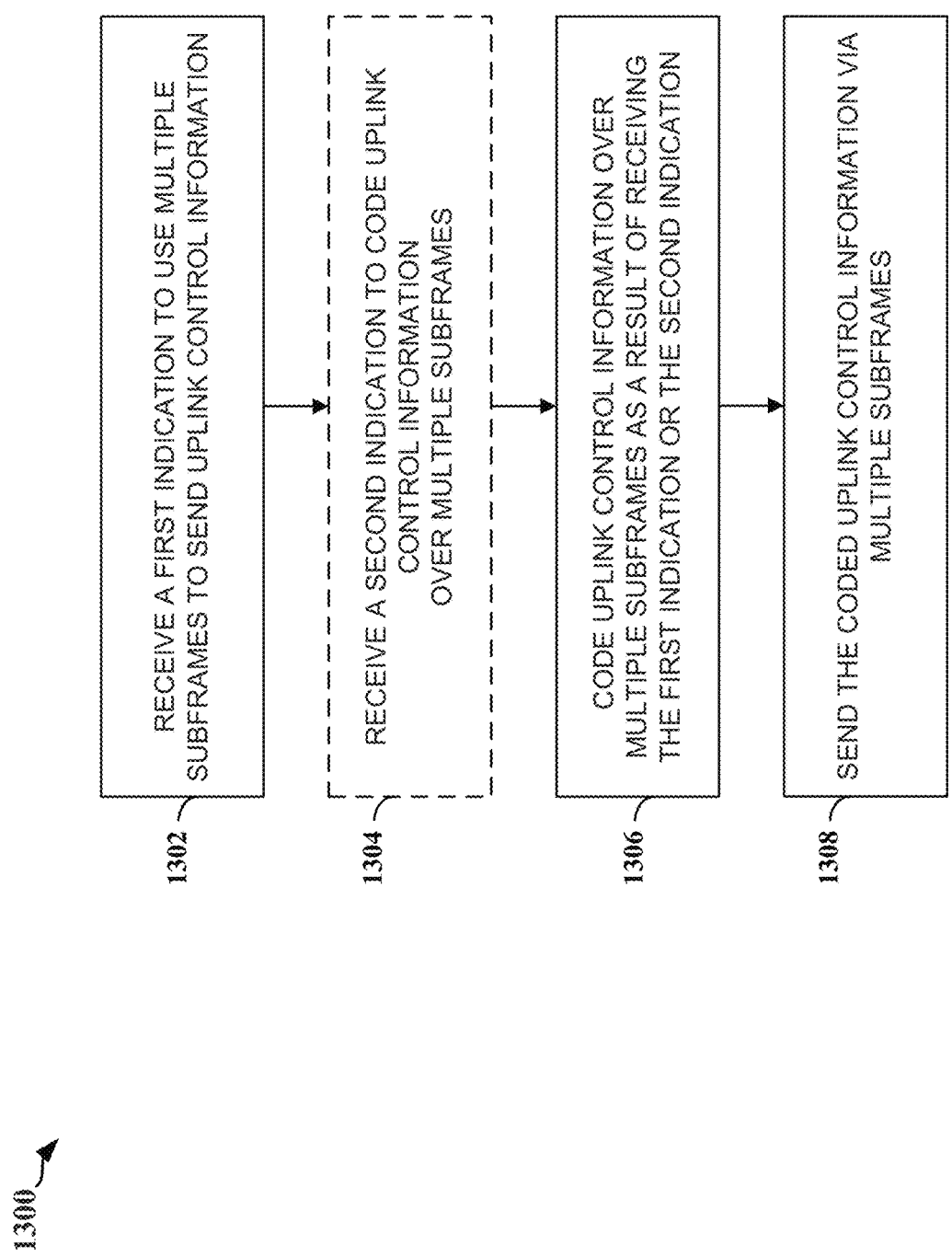
FIG. 13 illustrates a process for communication in accordance with some aspects of the disclosure.

The processing circuit 1210 may be a specialized processor, such as an application specific integrated circuit (ASIC) that serves as a means for (e.g., structure for) carrying out any one of the operations described in conjunction with FIG. 13. The processing circuit 1210 serves as one example of a means for transmitting and/or a means for receiving.

According to at least one example of the apparatus 1200, the processing circuit 1210 may include one or more of a receiving circuit/module 1220 for receiving a first indication to use multiple subframes to send uplink control information and/or receiving a second indication to code the uplink control information over the multiple subframes, or a sending circuit/module 1222 for sending coded uplink control information via the multiple subframes as a result of receiving the first indication and/or the second indication, or a coding circuit/module 1223 for coding the uplink control information over the multiple subframes as a result of receiving the first indication and/or the second indication.

As mentioned above, programming stored by the storage medium 1204, when executed by the processing circuit 1210, causes the processing circuit 1210 to perform one or more of the various functions and/or process operations described herein. For example, the programming, when executed by the processing circuit 1210, may cause the processing circuit 1210 to perform the various functions, steps, and/or processes described herein with respect to FIG. 13 in various implementations. As shown in FIG. 12, the storage medium 1204 may include one or more of the receiving instructions 1224, the sending instructions 1226, or the coding instructions 1228.

FIG. 13 illustrates a process 1300 for communication in accordance with some aspects of the disclosure. The process 1300 may take place within a processing circuit (e.g., the processor 1210 of FIG. 12), which may be located in a UE, a subordinate entity a BS, a scheduling entity, or some other suitable apparatus. Of course, in various aspects within the scope of the disclosure, the process 1300 may be implemented by any suitable apparatus capable of supporting communication-related operations.

The apparatus (e.g., a UE or subordinate entity) receives a first indication to use multiple subframes to send uplink control information 1302. Additionally or alternatively, the apparatus may receive a second indication to code the uplink control information over the multiple subframes 1304.

The apparatus codes the uplink control information over the multiple subframes as a result of receiving the first indication or the second indication 1306. The apparatus then sends the coded uplink control information via the multiple subframes 1308.

In an aspect of the disclosure, the multiple subframes are consecutive subframes. In a further aspect of the disclosure, the uplink control information may include physical uplink control channel (PUCCH) information. In another aspect of the disclosure, the uplink control information may include channel quality information, precoding matrix information, a scheduling request, acknowledgement information (e.g., ACK or NACK), and/or beam quality information. The channel quality information may include one or more combinations of signal to noise ratio (SNR), signal to interference plus noise ratio (SINR), reference signal received power (RSRP), reference signal received quality (RSRQ), and received signal strength indicator (RSSI).

Figure 14:
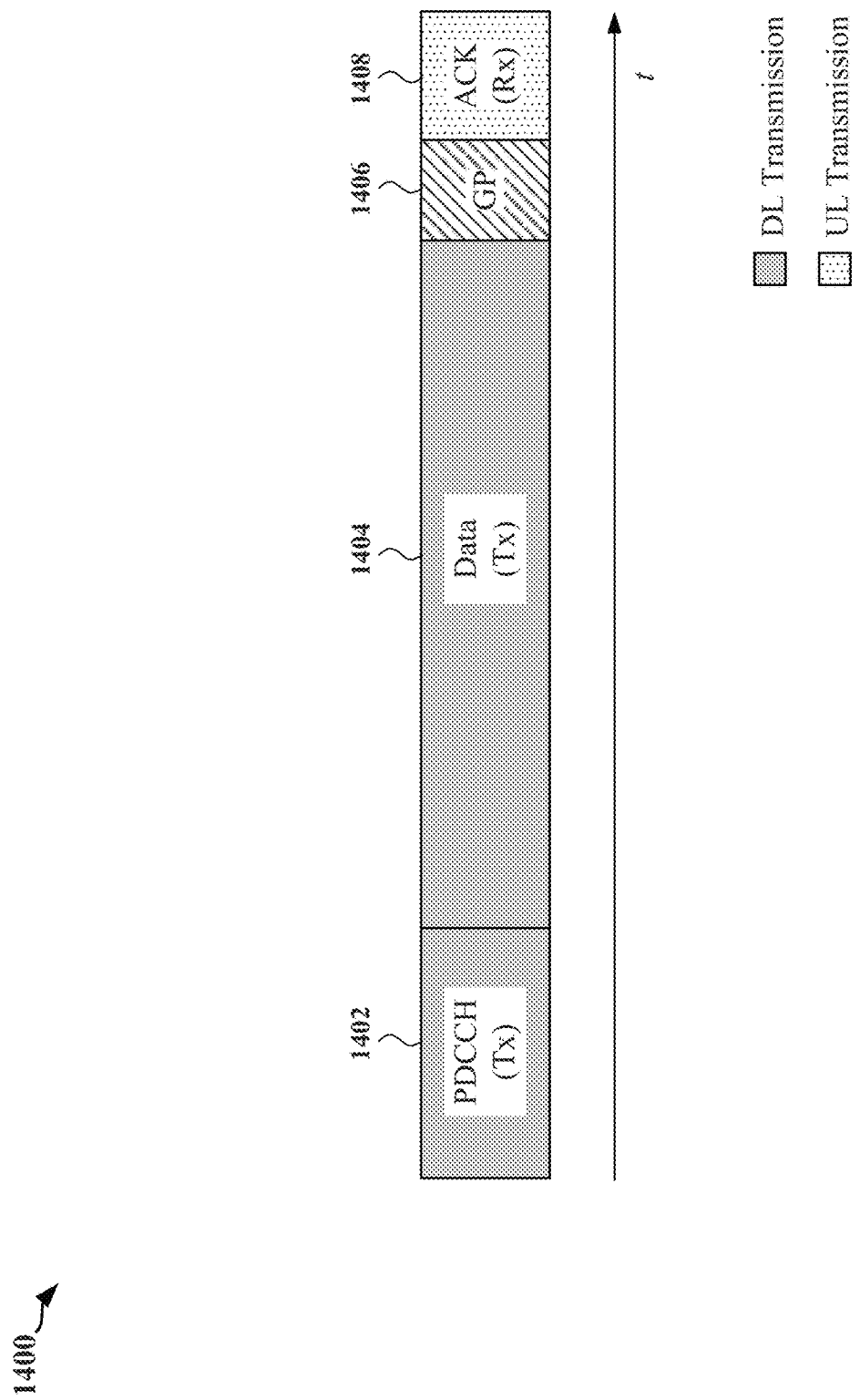
FIG. 14 illustrates an exemplary structure of a self-contained time division duplex (TDD) subframe.

Exemplary Description of Communicating Acknowledgement Information in a Wireless Communication Network FIG. 14 illustrates an exemplary structure of a self-contained time division duplex (TDD) subframe 1400. The self-contained subframe 1400 may have a fixed duration (t), but may also be configurable and determined during network deployment and/or may be updated through system messages. In one example, the duration of the self-contained subframe 1400 may be 500 μs. Of course, any suitable subframe duration may be utilized within the scope of the present disclosure.

The self-contained subframe structure shown in FIG. 14 is a transmitter-scheduled subframe, referred to herein as a downlink TTI subframe or DL-centric subframe 1400. The DL-centric subframe 1400 may be used to carry control and data information to one or more subordinate entities, which may be UEs for example, and to also receive acknowledgement information from the subordinate entity or entities within the same subframe. Thus, each DL-centric subframe includes both DL transmissions and UL transmissions and is divided with respect to time (t) into DL transmission and UL transmission portions.

In the example shown in FIG. 14, the DL transmission portions include a control portion 1402 and a data portion 1404, and the UL transmission portions include an acknowledgement (ACK/NACK) portion 1408. Therefore, within the subframe structure of FIG. 14, the scheduling entity first has an opportunity to transmit control/scheduling information in the control portion 1402, and then an opportunity to transmit data in the DL data portion 1404. Following a guard period (GP) portion 1406, the scheduling entity has an opportunity to receive acknowledged (ACK)/not acknowledged (NACK) signals (ACK/NACK packets) from subordinate entities using the carrier. This frame structure is downlink-centric, as more resources are allocated for transmissions in the downlink direction (e.g., transmissions from the scheduling entity) than for transmissions in the uplink direction (e.g., transmissions from the subordinate entities).

In one example, the control information portion 1402 may be used to transmit a physical downlink control channel (PDCCH) indicating time-frequency assignments of data packets intended for one or more subordinate entities, and the DL data portion 1404 may be used to transmit a data payload including the data packets intended for the one or more subordinate entities within the assigned time-frequency slots. Thus, each subordinate entity that will be receiving data in the data portion 1404 of the subframe 1400 may be individually addressed in the control portion 1402 of the subframe 1400, so that the subordinate entities can receive and process the correct downlink data packets. Thus, all of the data packets transmitted within the subframe 1400 may be scheduled according to the scheduling information in the control information portion 1402 of the same subframe 1400. Following the GP portion 1406, the scheduling entity may receive an ACK signal (or a NACK signal) during the ACK/NACK portion 1408 from each subordinate entity that received data packets during the data portion 1404 to indicate whether the data packets were successfully received. Thus, all of the data packets transmitted within the subframe 1400 may be acknowledged/not acknowledged within the same subframe 1400.

In other examples, the control portion 1402 may be used to transmit other downlink control channels and/or other downlink pilots, such as a channel state information-reference signal (CSI-RS). These additional downlink channels and/or pilots, along with any other downlink control information, may be transmitted together with the PDCCH within the control portion 1402. Broadly, any suitable transmission in the DL direction may be made complementary to the control information described above within the control portion 1402. In addition, the ACK/NACK portion 1408 may also be used for transmission of other uplink control channels and information, such as the physical uplink control channel (PUCCH), random access channel (RACH), scheduling request (SR), sounding reference signal (SRS), channel quality information (CQI), channel state feedback information, and buffer status. Broadly, any suitable transmission in the UL direction may be made complementary to the ACK/NACK and other information described above within the ACK/NACK portion 1408.

In an aspect, the data portion 1404 may be used to multiplex DL data transmissions to a set of subordinate entities (i.e., two or more subordinate entities) within the subframe 1400. For example, the scheduling entity may multiplex downlink data to the set of subordinate entities using time division multiplexing (TDM), frequency division multiplexing (FDM) (i.e., OFDM), code division multiplexing (CDM), and/or any suitable multiplexing scheme known to those of ordinary skill in the art. Thus, the DL data portion 1404 may include data for multiple users and up to a high order of multi-user MIMO. In addition, the control portion 1402 and ACK/NACK portion 1408 may also be used to multiplex control information to or from a set of subordinate entities in a TDM, FDM, CDM, and/or other suitable manner.

The GP portion 1406 may be scheduled to accommodate variability in UL and DL timing. For example, latencies due to RF antenna direction switching (e.g., from DL to UL) and RF settling (e.g., settling of phase lock loops, filters and power amplifiers), along with transmission path latencies, may cause the subordinate entity to transmit early on the UL to match DL timing. Such early transmission may interfere with symbols received from the scheduling entity. Accordingly, the GP portion 1406 may allow an amount of time after the DL data portion 1404 to prevent interference, where the GP portion 1406 may provide an appropriate amount of time for the scheduling entity to switch its RF antenna direction, for the over-the-air (OTA) transmission time, and time for ACK processing by the subordinate entity. The GP portion 1406 may further provide an appropriate amount of time for the subordinate entity to switch its RF antenna direction (e.g., from DL to UL), to processes the data payload, and for the over-the-air (OTA) transmission time.

The duration of the GP portion 1406 may be configurable based on, for example, the cell size and/or processing time requirements. For example, the GP portion 1406 may have a duration of one symbol period (e.g., 31.25 μs). However, in accordance with aspects of the disclosure, the switch point from DL to UL transmissions may be deterministic throughout the network. Thus, although the beginning point of the GP portion 1406 may be variable and configurable, the ending point of the GP portion 1406 corresponding to the switch point from DL transmissions to UL transmissions may be fixed by the network to manage interference between DL and UL transmissions. In an aspect, the switch point may be updated by the network in a semi-static manner and indicated in the PDCCH. In addition, the GP duration and/or beginning point of the GP portion 1406 may also be indicated in the PDCCH.

In networks utilizing unlicensed spectrum, the switch point may be maintained at a deterministic location, common to different cells. In scenarios in which the amount of data to be transmitted is less than that allocated to the data portion 1404, to avoid losing access to the TDD carrier, the data portion 1404 of the subframe 1400 can be filled by either extending the transmission to occupy only a portion of the frequency band or filling in the transmission with pilots or other filler symbols.

Figure 15:
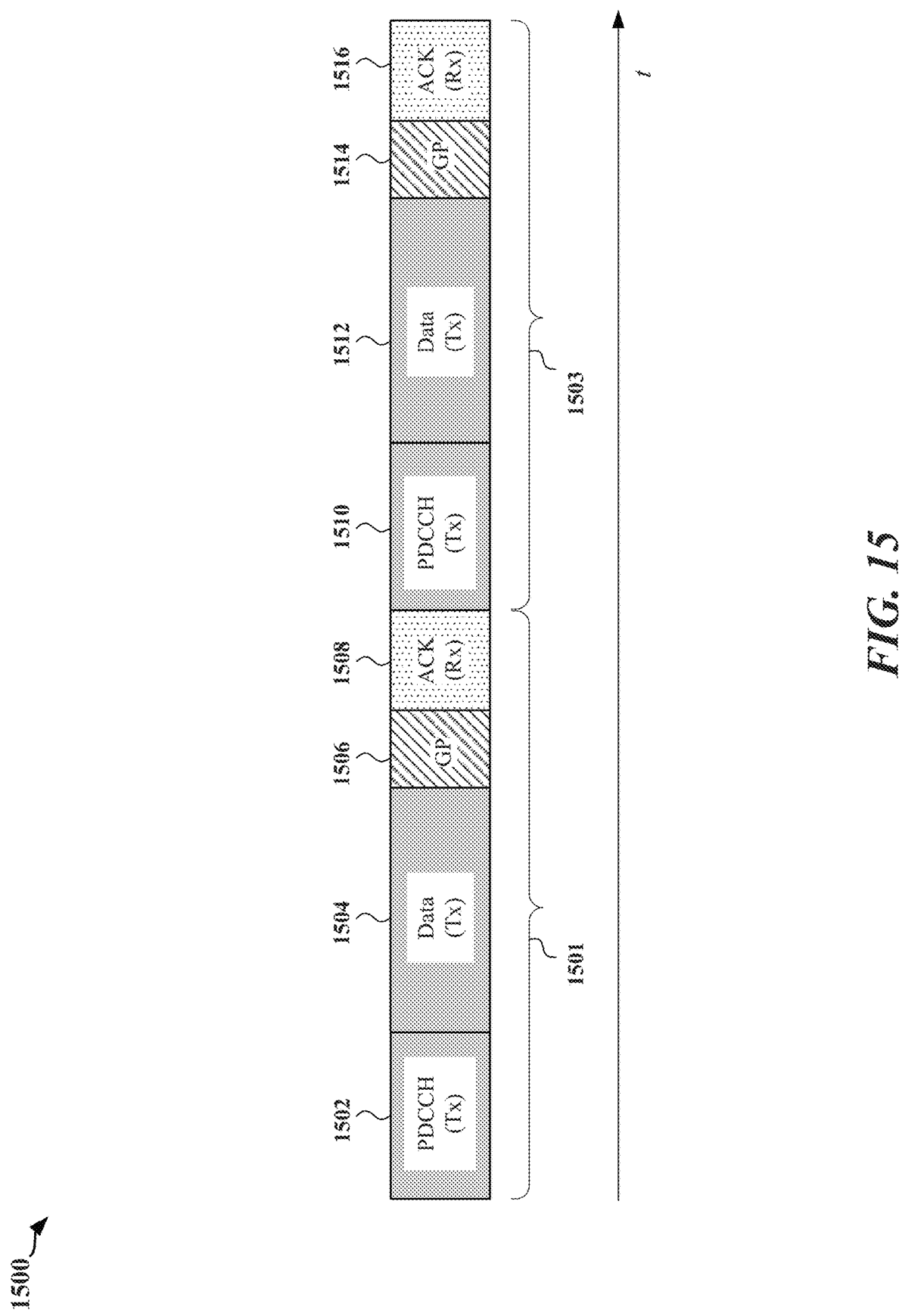
FIG. 15 is a diagram illustrating two contiguous DL-centric subframes.

FIG. 15 is a diagram 1500 illustrating two contiguous DL-centric subframes 1501 and 1503. Each subframe 1501 and 1503 has the same subframe structure as that shown in FIG. 14. For example, a first subframe 1501 includes a DL control portion 1502 followed by a DL data portion 1504, a guard period (GP) 1506, and an UL ACK/NACK portion 1508. Likewise, a second subframe 1503 includes a DL control portion 1510, a DL data portion 1512, a GP 1514, and an UL ACK/NACK portion 1516.

In an example, control information may be transmitted by the scheduling entity in the control portion 1502 of the first DL-centric subframe 1501, data information corresponding to the control information may be transmitted by the scheduling entity in the data portion 1504 of the first DL-centric subframe 1501 and acknowledgement information corresponding to the data information may be received by the scheduling entity from subordinate entities in the ACK/NACK portion 1508 of the first DL-centric subframe 1501. According to an aspect of the present disclosure, all of the data packets in the data portion 1504 may be acknowledged or not within the ACK/NACK portion 1508, that is, prior to the next scheduling instance. Here, the next scheduling instance refers to the scheduling of further data packets within the data portion 1512 of the subsequent subframe 1503, which are to be scheduled in the control portion 1510 of the subframe 1503.

Based on the ACK/NACK information received in the ACK/NACK portion 1508 of the first DL-centric subframe 1501, the scheduling entity may generate control information for the control portion 1510 of the next (second) DL-centric subframe 1503. For example, if the ACK/NACK information includes a NACK signal, at least part of the coded bits of the data information transmitted in the data portion 1504 of the first DL-centric subframe 1501 may be retransmitted (e.g., in an incremental redundancy HARQ algorithm, described further below) in the data portion 1512 of the second DL-centric subframe 1503. Thus, in accordance with aspects of the disclosure, all of the data packets transmitted in the first DL-centric subframe 1501 are acknowledged/not acknowledged prior to the next (second) DL-centric subframe 1503 to enable the scheduling entity to generate control information for the second DL-centric subframe 1503 based on the ACK/NACK information in the first DL-centric subframe 1501.

In an exemplary aspect of the disclosure, a hybrid automatic repeat request (HARQ) retransmission scheme is used to retransmit data incorrectly received. Thus, the control information (PDCCH) in the control portion 1510 of the second DL-centric subframe 1503 may further carry HARQ-related configuration information, such as HARQ identifiers, redundancy version, etc., to provide support for data retransmissions occurring in the data portion 1512 of the second DL-centric subframe 1503. For example, the control information may be configured to indicate whether or not a data packet included in the data portion is a HARQ retransmission.

The self-contained subframe structure shown in FIG. 15 supports single HARQ interlace processing at the physical layer to enable high data rates in extreme bandwidth cases with a reasonable HARQ buffer cost. By reducing or minimizing the ACK and retransmission latency at the physical layer, the self-contained subframe structure further reduces or minimizes the overall end-to-end latency.

In an aspect of the disclosure, the control information (PDCCH) transmitted by the scheduling entity in the control portion 1502 of the first DL-centric subframe 1501 may correspond to data information transmitted by the scheduling entity in the data portion 1504 of the first DL-centric subframe 1501. The control information may further include information allocating resources outside of the first DL-centric subframe 1501 for transmitting acknowledgement information corresponding to the data information transmitted in the data portion 1504 of the first DL-centric subframe 1501. For example, the control information transmitted in the control portion 1502 of the first DL-centric subframe 1501 may allocate the ACK/NACK portion 1516 of the second DL-centric subframe 1503 for transmitting acknowledgement information corresponding to the data information transmitted in the data portion 1504 of the first DL-centric subframe 1501. Accordingly, the scheduling entity may receive acknowledgement information corresponding to the data information transmitted in the data portion 1504 of the first DL-centric subframe 1501 from subordinate entities in the ACK/NACK portion 1516 of the second DL-centric subframe 1503, wherein the acknowledgement information is received based on the control information transmitted in the control portion 1502 of the first DL-centric subframe 1501.

Figure 16:
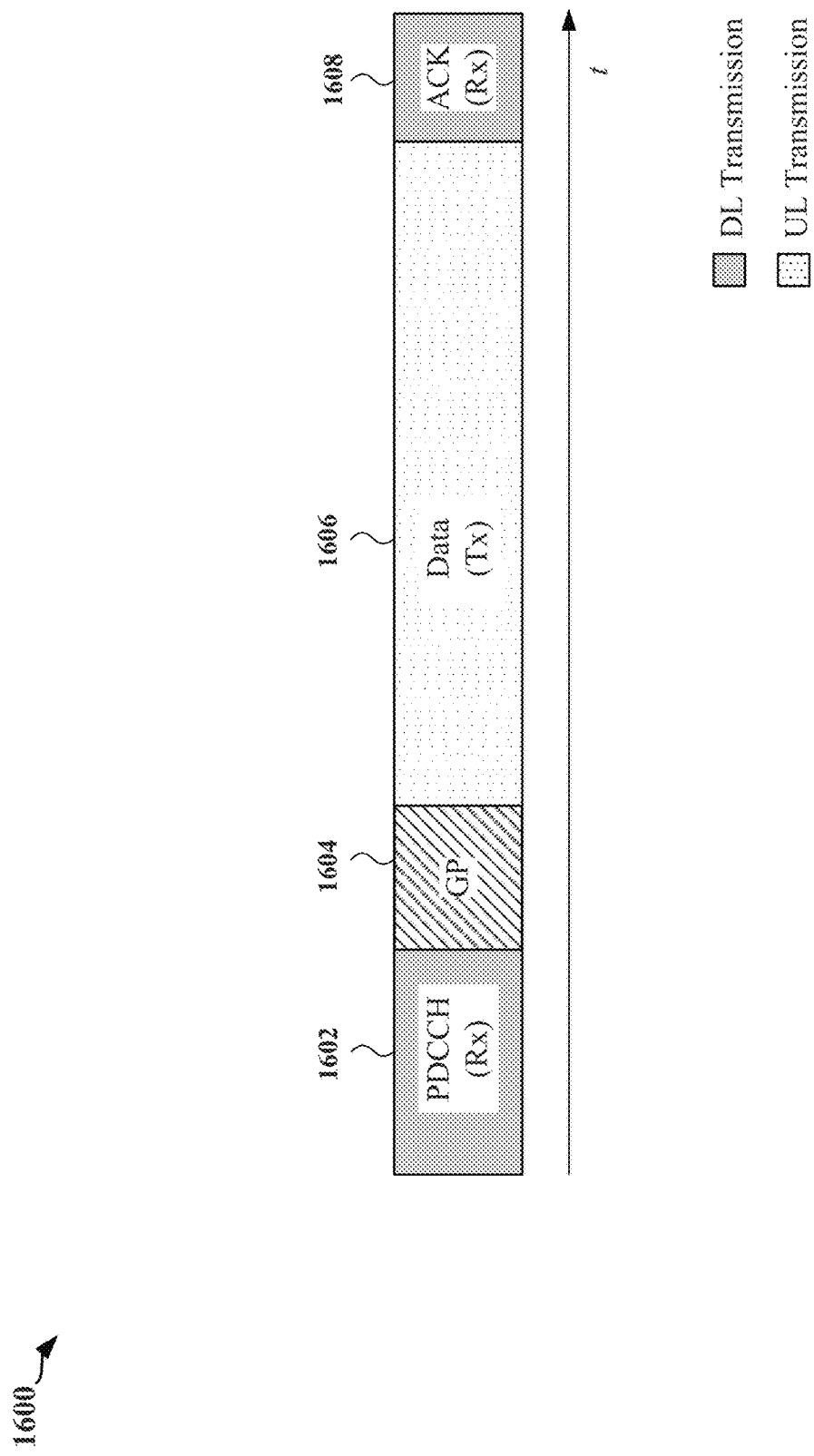
FIG. 16 illustrates another exemplary structure of a self-contained TDD subframe.

FIG. 16 illustrates another exemplary structure of a self-contained TDD subframe 1600. The self-contained subframe structure shown in FIG. 16 is a receiver-scheduled subframe, referred to herein as an uplink TTI subframe or UL-centric subframe 1600. The UL-centric subframe 1600 may be used to receive downlink control information from the scheduling entity, transmit uplink data to a scheduling entity, and receive a downlink ACK/NACK signal for the transmitted data from the scheduling entity. Thus, each UL-centric subframe 1600 also includes both DL transmissions and UL transmissions and is divided with respect to time (t) into DL transmission and UL transmission portions.

In the example shown in FIG. 16, the DL transmission portions include a control portion 1602 and an acknowledgement portion 1608, and the UL transmission portions include a data portion 1606. Therefore, within the UL-centric subframe structure shown in FIG. 16, the subordinate entity first has an opportunity to receive control information in the control portion 1602. Following a GP portion 1604, the subordinate entity has an opportunity to transmit data in the UL data portion 1606 and to receive acknowledgement information (e.g., an ACK/NACK signal) in the ACK/NACK portion 1608. This frame structure is uplink-centric, as more resources are allocated for transmissions in the uplink direction (e.g., transmissions from the subordinate entity) than in the downlink direction (e.g., transmissions from the scheduling entity).

In one example, the control information portion 1602 may be used to transmit a physical downlink control channel (PDCCH) indicating time-frequency assignments of data packets to be transmitted by one or more subordinate entities and the data portion 1606 may be used by the subordinate entities to transmit their data packets to the scheduling entity within the assigned time-frequency slots. Each subordinate entity that transmitted data within the data portion 1606 may then receive an ACK signal (or a NACK signal) during the ACK/NACK portion 1608 from the scheduling entity to indicate whether the data packets were successfully received at the scheduling entity. Thus, all of the data packets transmitted within the subframe 1600 may be acknowledged/not acknowledged within the same subframe 1600.

In other examples, the control portion 1602 and/or ACK/NACK portion 1608 may be used to transmit other downlink control channels and information and/or data from other layers. In addition, the data portion 1606 may also be used to transmit uplink control channels and information. For example, the control portion 1602 of a subframe 1600 may carry a data transmission (e.g., a small payload of data) for a subordinate entity, such as an application layer (or layer other than the physical layer) ACK from a previous subframe. The subordinate entity may then acknowledge the data transmission in the data portion 1606 of the same subframe 1600.

In an aspect, the UL data portion 1606 may be used to carry data transmissions from a set of subordinate entities (i.e., two or more subordinate entities) within the subframe 1600 using one or more TDMA, FDMA, CDMA, or any other suitable multiple access scheme. Thus, the UL data portion 1606 may include packets from multiple users and up to a high order of multi-user MIMO. In addition, the control portion 1602 and ACK/NACK portion 1608 may also be used to carry control information to a set of subordinate entities in a TDMA, FDMA, CDMA, or other suitable multiple access manner.

Figure 17A:
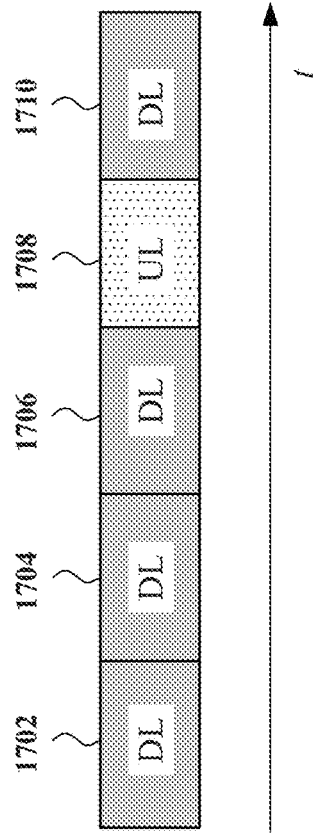
FIG. 17A illustrates an example of a consecutive sequence of TDD self-contained subframes, each having a TDD self-contained subframe structure.

FIG. 17A illustrates an example of a consecutive sequence 1700 of TDD self-contained subframes 1702, 1704, 1706, 1708 and 1710, each having a TDD self-contained subframe structure. A first subframe 1702, a second subframe 1704, and a third subframe 1706 are DL-centric subframes, each having, for example, the subframe structure shown in FIG. 14. Following the third DL-centric subframe 1706 is an UL-centric subframe 1708, which may have, for example, the subframe structure shown in FIG. 16. An additional DL-centric subframe 1710 follows the UL-centric subframe 1708. The sequence 1700 contains more DL-centric subframes than UL-centric subframes to provide sufficient resources to obtain high data rates for downlink data transmission applications. In other examples, UL-centric and DL-centric subframes may alternate or a greater number of UL-centric subframes may be provided in a particular sequence of subframes.

By utilizing a TDD self-contained subframe structure, such as those shown in FIGS. 14-16 above and FIG. 17B below, resources for the transmission of feedback, such as an ACK/NACK, can be made available within the same subframe for all data information transmitted within that subframe. In this way, a device utilizing this subframe structure need not wait for, or depend on, packets in a subsequent subframe. That is, subframes may accordingly be considered as discrete units.

Because the subframes can be considered independent or discrete, additional flexibility in the management of the air interface resources can be provided. For example, at any given time, at the end of any given subframe, the channel can easily be modified to pause or end communication utilizing the TDD carrier, and interpose other communication on the same spectrum resources, without causing substantial issues, e.g., in terms of having data packets waiting for ACK/NACK packets corresponding to data packets transmitted in previous subframes. In one example, a gap between subframe transmissions may be created to allow multiplexing of different types of traffic on the spectrum, including D2D, mesh, or a non-backward compatible technology.

Of course, these examples of self-contained subframe structures are merely provided to illustrate certain concepts of the disclosure. Those of ordinary skill in the art will comprehend that these are merely exemplary in nature, and other examples may fall within the scope of the disclosure.

In an aspect of the disclosure, when a scheduling entity detects that a subordinate entity has transmission power limitations negatively affecting reception at the scheduling entity, the scheduling entity may instruct the subordinate entity to activate TTI bundling. In TTI bundling, the subordinate entity may transmit the same data multiple times in a row to increase the possibility of data reception and decoding at the scheduling entity. For example, the subordinate entity may transmit the same packet but with different error detection and correction bits in two, three, or even four consecutive TTIs.

In a further example, when the scheduling entity sends a resource grant for an uplink transmission, the subordinate entity may transmit data at only one specific subframe. However, when TTI bundling is activated, the resource grant may apply to a number of consecutive subframes (bundled TTI). Accordingly, the subordinate entity may transmit the same data in the multiple consecutive subframes (bundled TTI).

The advantage of TTI bundling over sending a packet in a single TTI and then detecting that the packet was not received correctly, which in turn would lead to one or more retransmissions, is that TTI bundling reduces signaling overhead. Latency is also reduced as no wait time is required between the retransmissions. In case a bundled transmission is not received correctly, the bundled transmission is repeated in the same way as an ordinary packet transmission. Uplink resources over multiple TTIs can be assigned with a single grant.

In an aspect of the disclosure, when TTI bundling is activated, the subordinate entity may not only transmit data packets in multiple consecutive subframes (bundled TTI) but also transmit ACK/NACK information in the multiple consecutive subframes (ACK bundling). In a further aspect, the subordinate entity may transmit systematic bits and parity bits corresponding to the ACK/NACK information in the multiple consecutive subframes to improve ACK/NACK reception reliability. That is, by sending the ACK/NACK systematic bits and ACK/NACK parity bits in the multiple consecutive subframes, ACK/NACK bundling efficiency is improved, thus increasing the possibility of the scheduling entity receiving (correctly decoding) the ACK/NACK information. As mentioned above, TTI bundling is described with respect to transmissions over multiple consecutive subframes (or TTIs). However, in the present disclosure, ACK bundling may also be applied to transmissions over a plurality of (multiple) subframes (or TTIs) that are not necessarily consecutive.

In an aspect of the disclosure, to increase a link budget, the transmission of ACK/NACK information may be channelized in an UL-centric subframe and DL-centric subframes bundled over multiple TTIs. This may facilitate the delivery of downlink high throughput to a cell edge with power constraints. The ACK/NACK information may be associated with ePDCCH control information and downlink TTI bundling to improve downlink/uplink control/data link budget.

In an aspect of the disclosure, control information for an ACK symbol may be prescheduled (full duplex) to enable early decoding of the control information with large downlink power. In a further aspect of the disclosure, more ACK symbols per duration may be realized by utilizing frequency division-time division duplex (FD-TDD). For example, ACK/NACK information may be channelized in a DL-centric subframe using frequency division multiplexing (FDM) and a guard band (GB).

In an aspect of the disclosure, ACK/NACK information may be coded across multiple subframes. For example, a subordinate entity (transmitting device) may transmit systematic bits that are ACK/NACK information in one or more DL-centric self-contained subframes while transmitting coded bits (parity bits) associated with the ACK/NACK information in an UL-centric self-contained subframe. Accordingly, a scheduling entity (receiving device) may process the systematic bits received in the one or more DL-centric self-contained subframes jointly with the coded bits (parity bits) received in the UL-centric self-contained subframe. Therefore, coding/diversity gain is achieved in addition to link budget gain.

Referring back to FIG. 17A, in an example implementation, a subordinate entity (transmitting device) may transmit systematic bits associated with ACK/NACK information in each of a first DL-centric subframe 1702, a second DL-centric subframe 1704, and a third DL-centric subframe 1706. The subordinate entity may further transmit bundled and coded bits (parity bits) associated with the ACK/NACK information in an UL-centric subframe 1708. The systematic bits may also be transmitted in the UL-centric subframe 1708.

In an aspect of the disclosure, a scheduling entity (e.g., receiving device) may jointly process the systematic bits received in the previous individual DL-centric subframes 1702, 1704, 1706 with the bundled and coded bits (parity bits) received in the UL-centric subframe 1708. The bundled and coded bits (parity bits) help decode the systematic bits more reliably. Thus, by bundling and coding the ACK/NACK information across the multiple DL-centric subframes 1702, 1704, and 1706 and the UL-centric subframe 1708, the novel scheme of the present disclosure allows the scheduling entity to more reliably receive the ACK/NACK information sent from the subordinate entity. Moreover, ACK information and NACK information are generally transmitted over a same medium that data travels through. Occasionally, a transmitted ACK can be received as NACK, and vice versa. This error may be referred to as ACK-to-NACK error or NACK-to-ACK error, respectively. Accordingly, the novel scheme also helps detect NACK-to-ACK error and start earlier retransmission.

In an aspect of the disclosure, acknowledgement information (ACK/NACK) may be transmitted every TTI (e.g., downlink-centric self-contained subframe) via a short acknowledgement portion of the downlink-centric self-contained subframe. In addition, bundled and coded acknowledgement information of multiple downlink-centric subframes may be transmitted via a data portion of an uplink-centric self-contained subframe. The data portion of the uplink-centric self-contained subframe has a longer burst duration to facilitate higher link budget and reliability by coding the acknowledgement information across multiple downlink-centric self-contained subframes. The acknowledgement information of each downlink-centric self-contained subframe may be utilized as soft information regarding systematic bits of the bundled and coded acknowledgement information.

Figure 17B:
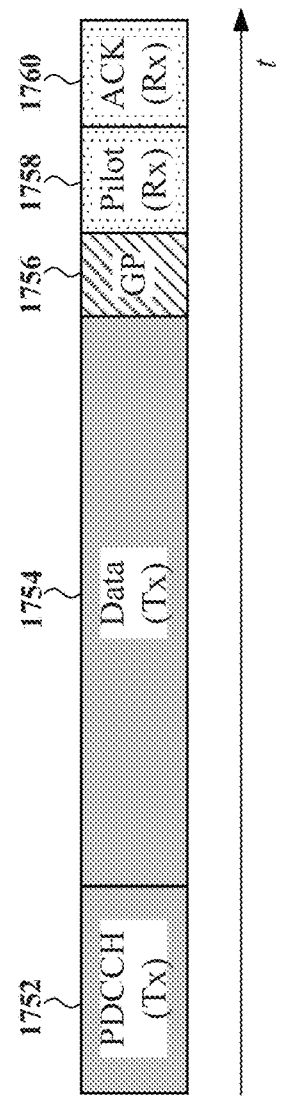
FIG. 17B illustrates another exemplary structure of a self-contained TDD subframe.

FIG. 17B illustrates another exemplary structure of a self-contained TDD subframe 1750. The self-contained subframe 1750 may have a fixed duration (t), but may also be configurable and determined during network deployment and/or may be updated through system messages. The self-contained subframe structure shown in FIG. 17B is a downlink TTI subframe or DL-centric subframe 1750.

In the example shown in FIG. 17B, the DL transmission portions include a control portion 1752 and a data portion 1754, and the UL transmission portions include a pilot portion 1758 and an acknowledgment (ACK/NACK) portion 1760. Therefore, within the subframe structure of FIG. 17B, the scheduling entity first has an opportunity to transmit control/scheduling information in the control portion 1752, and then an opportunity to transmit data in the DL data portion 1754. Following a guard period (GP) portion 1756, the scheduling entity has back-to-back opportunities to receive pilot signals for acknowledged (ACK)/not acknowledged (NACK) signals (ACK/NACK packets) and the ACK/NACK signals from subordinate entities using the pilot portion 1758 and the acknowledgement portion 1760. If ACK/NACK signal multiplexing occurs between a PHY layer ACK/NACK signal and a MAC layer ACK/NACK signal, then both types of ACK/NACK signals would be multiplexed in the same acknowledgement portion 1760.

In an aspect of the disclosure, if one NACK-to-ACK is decoded in error, bundled and coded acknowledgement information received via an uplink-centric self-contained subframe will help detect such error with boosted reliability while reducing HARQ retransmission latency and buffer requirements. By decoding the bundled and coded acknowledgement information, if an ACK/NACK decoding error were identified in a self-contained subframe causing lost data packets, retransmission of the lost data packets may be performed at a medium access control (MAC) layer or higher layer. In a further aspect of the disclosure, the solutions described herein may also be applied to improve uplink data acknowledgement reliability, reduce latency, etc.

Figure 18:
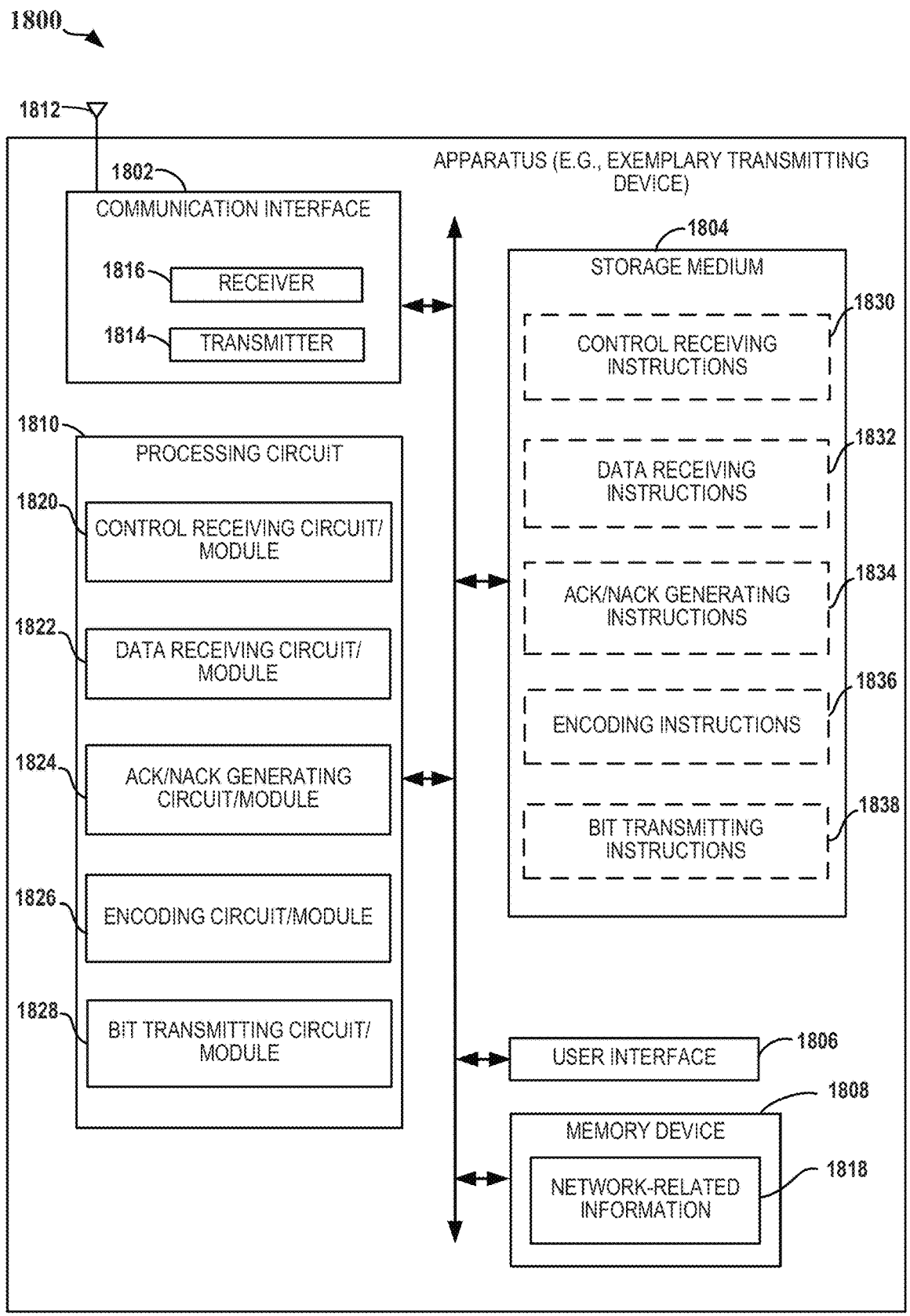
FIG. 18 is an illustration of an apparatus configured to support operations related to transmitting acknowledgement information in a wireless communication network according to one or more aspects of the disclosure.

Exemplary Devices and Methods for Communicating Acknowledgement Information in a Wireless Communication Network FIG. 18 is an illustration of an apparatus 1800 configured to support operations related to transmitting acknowledgement information in a wireless communication network according to one or more aspects of the disclosure (e.g., aspects related to the method of FIG. 19 described below). The apparatus 1800 includes a communication interface (e.g., at least one transceiver) 1802, a storage medium 1804, a user interface 1806, a memory device 1808, and a processing circuit 1810.

These components can be coupled to and/or placed in electrical communication with one another via a signaling bus or other suitable component, represented generally by the connection lines in FIG. 18. The signaling bus may include any number of interconnecting buses and bridges depending on the specific application of the processing circuit 1810 and the overall design constraints. The signaling bus links together various circuits such that each of the communication interface 1802, the storage medium 1804, the user interface 1806, and the memory device 1808 are coupled to and/or in electrical communication with the processing circuit 1810. The signaling bus may also link various other circuits (not shown) such as timing sources, peripherals, voltage regulators, and power management circuits, which are well known in the art, and therefore, will not be described any further.

The communication interface 1802 may be adapted to facilitate wireless communication of the apparatus 1800. For example, the communication interface 1802 may include circuitry and/or code (e.g., instructions) adapted to facilitate the communication of information bi-directionally with respect to one or more communication devices in a network. The communication interface 1802 may be coupled to one or more antennas 1812 for wireless communication within a wireless communication system. The communication interface 1802 can be configured with one or more standalone receivers and/or transmitters, as well as one or more transceivers. In the illustrated example, the communication interface 1802 includes a transmitter 1814 and a receiver 1816.

The memory device 1808 may represent one or more memory devices. As indicated, the memory device 1808 may maintain network-related information 1818 along with other information used by the apparatus 1800. In some implementations, the memory device 1808 and the storage medium 1804 are implemented as a common memory component. The memory device 1808 may also be used for storing data that is manipulated by the processing circuit 1810 or some other component of the apparatus 1800.

The storage medium 1804 may represent one or more computer-readable, machine-readable, and/or processor-readable devices for storing code, such as processor executable code or instructions (e.g., software, firmware), electronic data, databases, or other digital information. The storage medium 1804 may also be used for storing data that is manipulated by the processing circuit 1810 when executing code. The storage medium 1804 may be any available media that can be accessed by a general purpose or special purpose processor, including portable or fixed storage devices, optical storage devices, and various other mediums capable of storing, containing or carrying code.

By way of example and not limitation, the storage medium 1804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1804 may be embodied in an article of manufacture (e.g., a computer program product). By way of example, a computer program product may include a computer-readable medium in packaging materials. In view of the above, in some implementations, the storage medium 1804 may be a non-transitory (e.g., tangible) storage medium.

The storage medium 1804 may be coupled to the processing circuit 1810 such that the processing circuit 1810 can read information from, and write information to, the storage medium 1804. That is, the storage medium 1804 can be coupled to the processing circuit 1810 so that the storage medium 1804 is at least accessible by the processing circuit 1810, including examples where at least one storage medium is integral to the processing circuit 1810 and/or examples where at least one storage medium is separate from the processing circuit 1810 (e.g., resident in the apparatus 1800, external to the apparatus 1800, distributed across multiple entities, etc.).

Code and/or instructions stored by the storage medium 1804, when executed by the processing circuit 1810, causes the processing circuit 1810 to perform one or more of the various functions and/or process operations described herein. For example, the storage medium 1804 may include operations configured for regulating operations at one or more hardware blocks of the processing circuit 1810, as well as to utilize the communication interface 1802 for wireless communication utilizing their respective communication protocols.

The processing circuit 1810 is generally adapted for processing, including the execution of such code/instructions stored on the storage medium 1804. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1810 is arranged to obtain, process and/or send data, control data access and storage, issue commands, and control other desired operations. The processing circuit 1810 may include circuitry configured to implement desired code provided by appropriate media in at least one example. For example, the processing circuit 1810 may be implemented as one or more processors, one or more controllers, and/or other structure configured to execute executable code. Examples of the processing circuit 1810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1810 are for illustration and other suitable configurations within the scope of the disclosure are also contemplated.

According to one or more aspects of the disclosure, the processing circuit 1810 may be adapted to perform any or all of the features, processes, functions, operations and/or routines for any or all of the apparatuses described herein. As used herein, the term "adapted" in relation to the processing circuit 1810 may refer to the processing circuit 1810 being one or more of configured, employed, implemented, and/or programmed to perform a particular process, function, operation and/or routine according to various features described herein.

Figure 19:
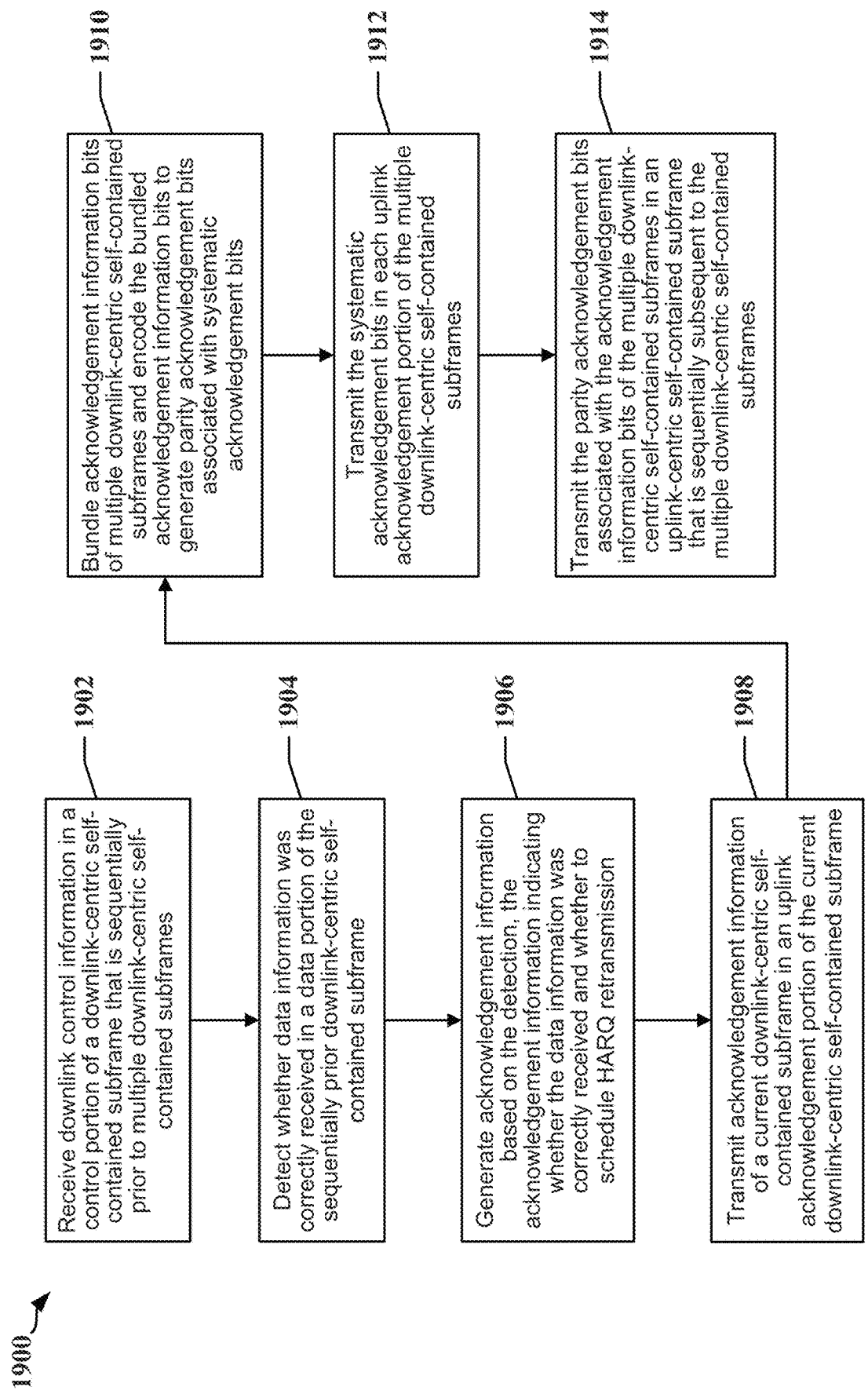
FIG. 19 is a flowchart illustrating a method of wireless communication at a communication device.

According to at least one example of the apparatus 1800, the processing circuit 1810 may include one or more of a control receiving circuit/module 1820, a data receiving circuit/module 1822, an ACK/NACK generating circuit/module 1824, an encoding circuit/module 1826, and a bit transmitting circuit/module 1828, that are adapted to perform any or all of the features, processes, functions, operations and/or routines described herein (e.g., features, processes, functions, operations and/or routines described with respect to FIG. 19).

The control receiving circuit/module 1820 may include circuitry and/or instructions (e.g., control receiving instructions 1830 stored on the storage medium 1804) adapted to perform several functions relating to, for example, receiving downlink control information in a control portion of a downlink-centric self-contained subframe that is sequentially prior to multiple downlink-centric self-contained subframes. The downlink control information may indicate a data portion of the sequentially prior downlink-centric self-contained subframe for receiving data information and one or more acknowledgement portions of the multiple downlink-centric self-contained subframes for transmitting acknowledgement information.

The data receiving circuit/module 1822 may include circuitry and/or instructions (e.g., data receiving instructions 1832 stored on the storage medium 1804) adapted to perform several functions relating to, for example, detecting whether the data information was correctly received in the data portion of the sequentially prior downlink-centric self-contained subframe.

The ACK/NACK generating circuit/module 1824 may include circuitry and/or instructions (e.g., ACK/NACK generating instructions 1834 stored on the storage medium 1804) adapted to perform several functions relating to, for example, generating the acknowledgement information based on the detection. The acknowledgement information may indicate whether the data information was correctly received and whether to schedule a hybrid automatic repeat request (HARQ) retransmission. The ACK/NACK generating circuit/module 1824 may further include circuitry and/or instructions (e.g., ACK/NACK generating instructions 1834 stored on the storage medium 1804) adapted to perform functions relating to transmitting the acknowledgement information of a current downlink-centric self-contained subframe in an uplink acknowledgement portion of the current downlink-centric self-contained subframe.

The encoding circuit/module 1826 may include circuitry and/or instructions (e.g., encoding instructions 1836 stored on the storage medium 1804) adapted to perform several functions relating to, for example, bundling acknowledgement information bits of multiple downlink-centric self-contained subframes and encoding the bundled acknowledgement information bits to generate parity acknowledgement bits associated with systematic acknowledgement bits.

The bit transmitting circuit/module 1828 may further include circuitry and/or instructions (e.g., bit transmitting instructions 1838 stored on the storage medium 1804) adapted to perform several functions relating to, for example, transmitting the systematic acknowledgement bits in each uplink acknowledgement portion of the multiple downlink-centric self-contained subframes and transmitting the parity acknowledgement bits associated with the acknowledgement information bits of the multiple downlink-centric self-contained subframes in an uplink-centric self-contained subframe that is sequentially subsequent to the multiple downlink-centric self-contained subframes. The parity acknowledgement bits may be transmitted in a data portion of the uplink-centric self-contained subframe.

As mentioned above, instructions stored by the storage medium 1804, when executed by the processing circuit 1810, causes the processing circuit 1810 to perform one or more of the various functions and/or process operations described herein. For example, the storage medium 1804 may include one or more of the control receiving instructions 1830, the data receiving instructions 1832, the ACK/NACK generating instructions 1834, the encoding instructions 1836, and the bit transmitting instructions 1838.

FIG. 19 is a flowchart 1900 illustrating a method of wireless communication at a communication device (e.g., transmitting device). The method may be performed by an apparatus (e.g., subordinate entity 204, apparatus 1800 employing processing circuit 1810, or any other suitable apparatus or means for carrying out the described functions).

Features of the flowchart 1900 may provide further detail to one or more features of the process 1300 of FIG. 13. For example, referring to the process 1300, the apparatus (e.g., a UE or subordinate entity) receives a first indication to use multiple subframes to send uplink control information (1302) and/or receives a second indication to code the uplink control information over the multiple subframes (1304). Accordingly, the apparatus may receive the first indication or the second indication by receiving downlink control information as described with respect to the flowchart 1900.

Referring to FIG. 19, the apparatus receives the downlink control information in a control portion of a downlink-centric self-contained subframe that is sequentially prior to multiple downlink-centric self-contained subframes 1902. The downlink control information may indicate a data portion of the sequentially prior downlink-centric self-contained subframe for receiving data information and one or more acknowledgement portions of the multiple downlink-centric self-contained subframes for transmitting acknowledgement information.

The apparatus further detects whether the data information was correctly received in the data portion of the sequentially prior downlink-centric self-contained subframe 1904 and generates the acknowledgement information based on the detection 1906. The acknowledgement information may indicate whether the data information was correctly received (e.g., ACK or NACK) and whether to schedule a hybrid automatic repeat request (HARQ) retransmission.

Again referring to FIG. 13, the apparatus codes and sends the uplink control information over multiple subframes as a result of receiving the first indication or the second indication (1306, 1308). Accordingly, the apparatus may code and send the uplink control information according to the first indication or the second indication by transmitting the acknowledgement information as described with respect to the flowchart 1900.

Referring to FIG. 19, the apparatus transmits the acknowledgement information of a current downlink-centric self-contained subframe in an uplink acknowledgement portion of the current downlink-centric self-contained subframe 1908. The apparatus bundles acknowledgement information bits of multiple downlink-centric self-contained subframes and encodes the bundled acknowledgement information bits to generate parity acknowledgement bits associated with systematic acknowledgement bits 1910. Thereafter, the apparatus transmits the systematic acknowledgement bits in each uplink acknowledgement portion of the multiple downlink-centric self-contained subframes 1912 and transmits the parity acknowledgement bits associated with the acknowledgement information bits of the multiple downlink-centric self-contained subframes in an uplink-centric self-contained subframe that is sequentially subsequent to the multiple downlink-centric self-contained subframes 1914. The apparatus may transmit the parity acknowledgment bits in a data portion of the uplink-centric self-contained subframe.

Figure 20:
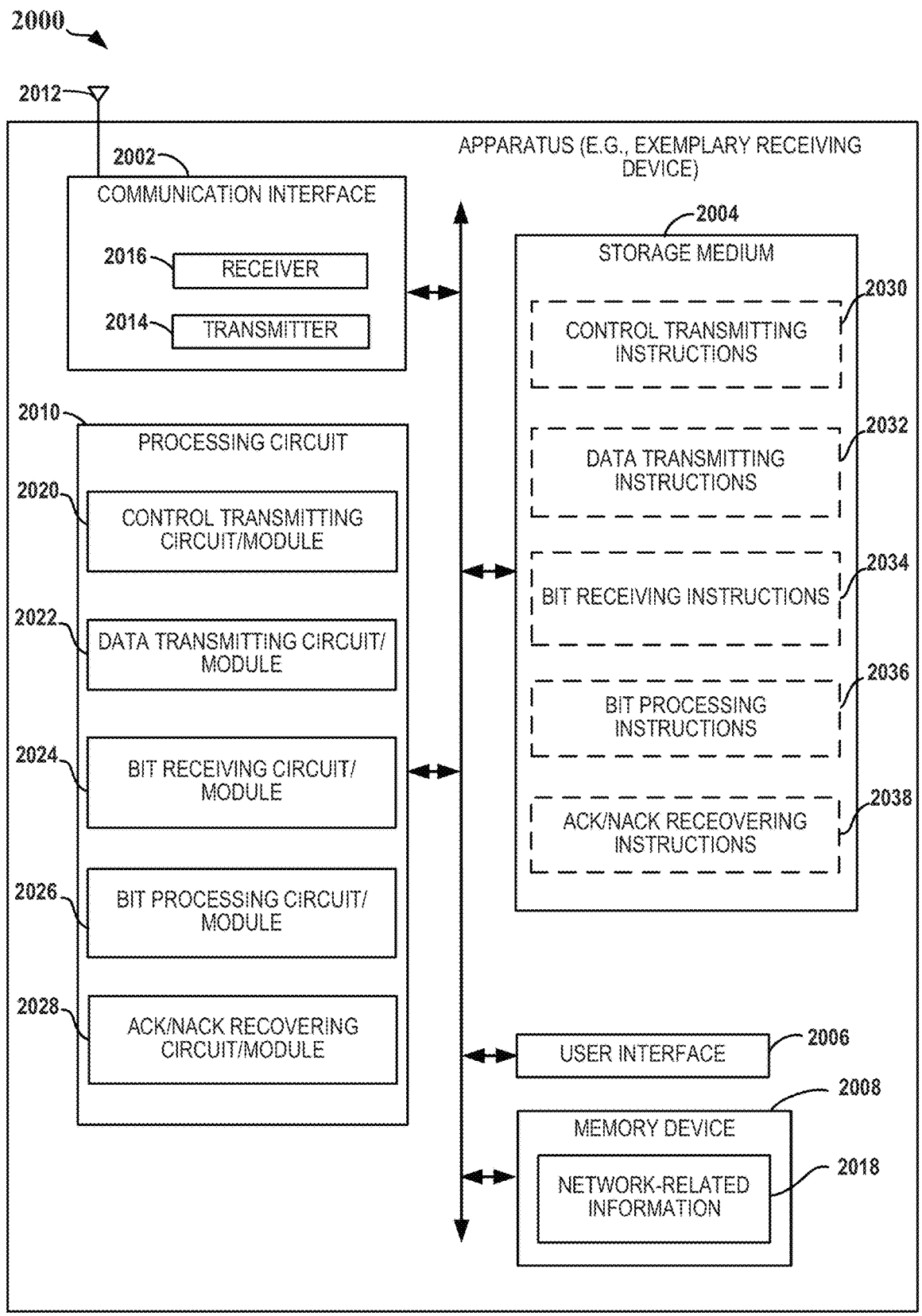
FIG. 20 is an illustration of an apparatus configured to support operations related to receiving acknowledgement information in a wireless communication network according to one or more aspects of the disclosure.

FIG. 20 is an illustration of an apparatus 2000 configured to support operations related to receiving acknowledgement information in a wireless communication network according to one or more aspects of the disclosure (e.g., aspects related to the method of FIG. 21 described below). The apparatus 2000 includes a communication interface (e.g., at least one transceiver) 2002, a storage medium 2004, a user interface 2006, a memory device 2008, and a processing circuit 2010.

These components can be coupled to and/or placed in electrical communication with one another via a signaling bus or other suitable component, represented generally by the connection lines in FIG. 20. The signaling bus may include any number of interconnecting buses and bridges depending on the specific application of the processing circuit 2010 and the overall design constraints. The signaling bus links together various circuits such that each of the communication interface 2002, the storage medium 2004, the user interface 2006, and the memory device 2008 are coupled to and/or in electrical communication with the processing circuit 2010. The signaling bus may also link various other circuits (not shown) such as timing sources, peripherals, voltage regulators, and power management circuits, which are well known in the art, and therefore, will not be described any further.

The communication interface 2002 may be adapted to facilitate wireless communication of the apparatus 2000. For example, the communication interface 2002 may include circuitry and/or code (e.g., instructions) adapted to facilitate the communication of information bi-directionally with respect to one or more communication devices in a network. The communication interface 2002 may be coupled to one or more antennas 2012 for wireless communication within a wireless communication system. The communication interface 2002 can be configured with one or more standalone receivers and/or transmitters, as well as one or more transceivers. In the illustrated example, the communication interface 2002 includes a transmitter 2014 and a receiver 2016.

The memory device 2008 may represent one or more memory devices. As indicated, the memory device 2008 may maintain network-related information 2018 along with other information used by the apparatus 2000. In some implementations, the memory device 2008 and the storage medium 2004 are implemented as a common memory component. The memory device 2008 may also be used for storing data that is manipulated by the processing circuit 2010 or some other component of the apparatus 2000.

The storage medium 2004 may represent one or more computer-readable, machine-readable, and/or processor-readable devices for storing code, such as processor executable code or instructions (e.g., software, firmware), electronic data, databases, or other digital information. The storage medium 2004 may also be used for storing data that is manipulated by the processing circuit 2010 when executing code. The storage medium 2004 may be any available media that can be accessed by a general purpose or special purpose processor, including portable or fixed storage devices, optical storage devices, and various other mediums capable of storing, containing or carrying code.

By way of example and not limitation, the storage medium 2004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2004 may be embodied in an article of manufacture (e.g., a computer program product). By way of example, a computer program product may include a computer-readable medium in packaging materials. In view of the above, in some implementations, the storage medium 2004 may be a non-transitory (e.g., tangible) storage medium.

The storage medium 2004 may be coupled to the processing circuit 2010 such that the processing circuit 2010 can read information from, and write information to, the storage medium 2004. That is, the storage medium 2004 can be coupled to the processing circuit 2010 so that the storage medium 2004 is at least accessible by the processing circuit 2010, including examples where at least one storage medium is integral to the processing circuit 2010 and/or examples where at least one storage medium is separate from the processing circuit 2010 (e.g., resident in the apparatus 2000, external to the apparatus 2000, distributed across multiple entities, etc.).

Code and/or instructions stored by the storage medium 2004, when executed by the processing circuit 2010, causes the processing circuit 2010 to perform one or more of the various functions and/or process operations described herein. For example, the storage medium 2004 may include operations configured for regulating operations at one or more hardware blocks of the processing circuit 2010, as well as to utilize the communication interface 2002 for wireless communication utilizing their respective communication protocols.

The processing circuit 2010 is generally adapted for processing, including the execution of such code/instructions stored on the storage medium 2004. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2010 is arranged to obtain, process and/or send data, control data access and storage, issue commands, and control other desired operations. The processing circuit 2010 may include circuitry configured to implement desired code provided by appropriate media in at least one example. For example, the processing circuit 2010 may be implemented as one or more processors, one or more controllers, and/or other structure configured to execute executable code. Examples of the processing circuit 2010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2010 are for illustration and other suitable configurations within the scope of the disclosure are also contemplated.

According to one or more aspects of the disclosure, the processing circuit 2010 may be adapted to perform any or all of the features, processes, functions, operations and/or routines for any or all of the apparatuses described herein. As used herein, the term "adapted" in relation to the processing circuit 2010 may refer to the processing circuit 2010 being one or more of configured, employed, implemented, and/or programmed to perform a particular process, function, operation and/or routine according to various features described herein.

Figure 21:
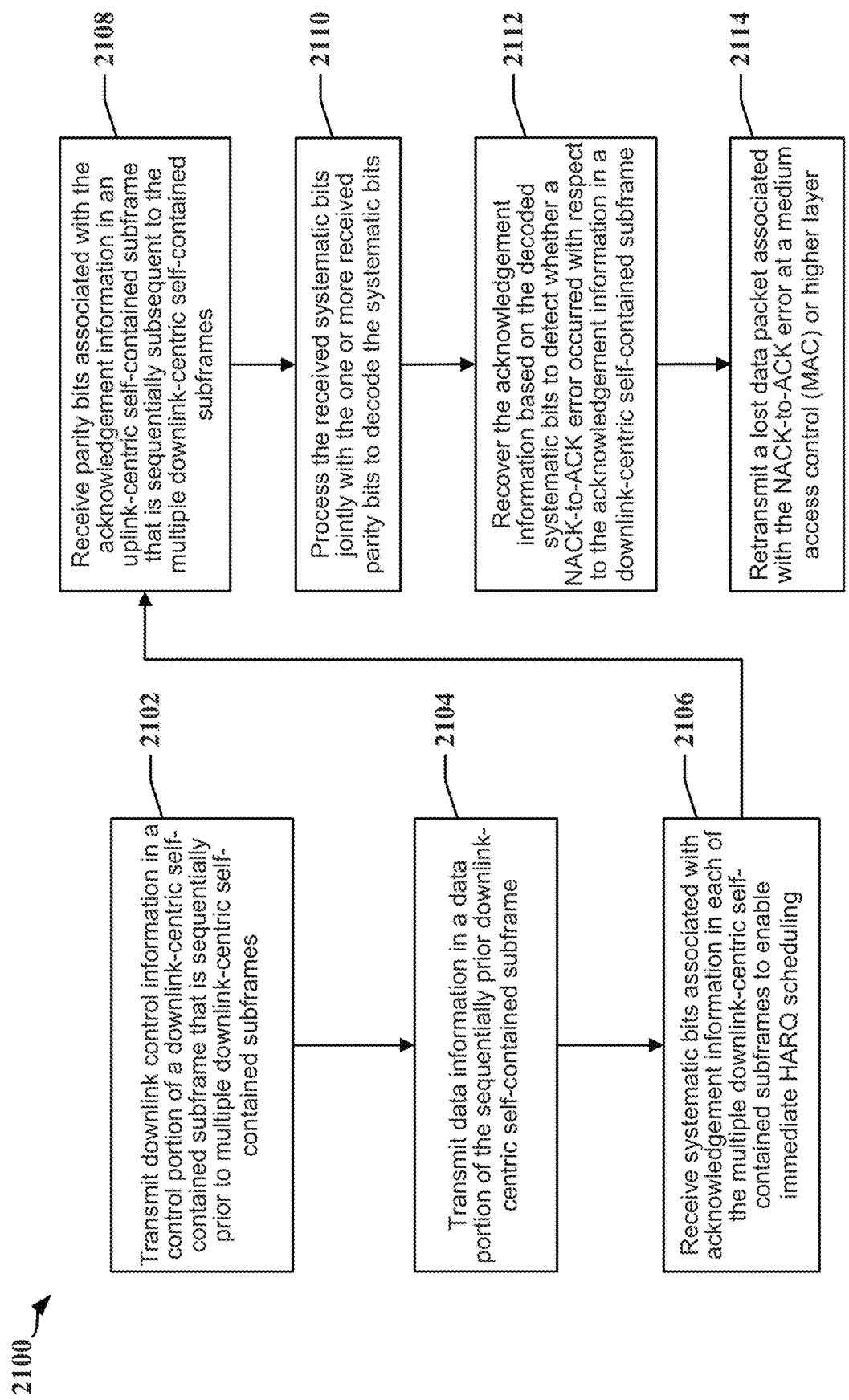
FIG. 21 is a flowchart illustrating a method of wireless communication at a communication device.

According to at least one example of the apparatus 2000, the processing circuit 2010 may include one or more of a control transmitting circuit/module 2020, a data transmitting circuit/module 2022, a bit receiving circuit/module 2024, a bit processing circuit/module 2026, and an ACK/NACK recovering circuit/module 2028, that are adapted to perform any or all of the features, processes, functions, operations and/or routines described herein (e.g., features, processes, functions, operations and/or routines described with respect to FIG. 21).

The control transmitting circuit/module 2020 may include circuitry and/or instructions (e.g., control transmitting instructions 2030 stored on the storage medium 2004) adapted to perform several functions relating to, for example, transmit, to a subordinate entity (e.g., UE), downlink control information in a control portion of a downlink-centric self-contained subframe that is sequentially prior to multiple downlink-centric self-contained subframes. The downlink control information may indicate a data portion of the sequentially prior downlink-centric self-contained subframe for transmitting data information to the subordinate entity and one or more acknowledgement portions of the plurality of consecutive downlink-centric self-contained subframes for receiving acknowledgement information from the subordinate entity.

The data transmitting circuit/module 2022 may include circuitry and/or instructions (e.g., data transmitting instructions 2032 stored on the storage medium 2004) adapted to perform several functions relating to, for example, transmitting, to the subordinate entity, the data information in the data portion of the sequentially prior downlink-centric self-contained subframe. The acknowledgement information may indicate whether the data information was correctly received by the subordinate entity. The data transmitting circuit/module 2022 may further include circuitry and/or instructions (e.g., data transmitting instructions 2032 stored on the storage medium 2004) adapted to perform functions relating to retransmitting a lost data packet associated with an NACK-to-ACK error at a medium access control (MAC) or higher layer.

The bit receiving circuit/module 2024 may include circuitry and/or instructions (e.g., bit receiving instructions 2034 stored on the storage medium 2004) adapted to perform several functions relating to, for example, receiving systematic bits associated with the acknowledgement information in each of the multiple downlink-centric self-contained subframes to enable immediate hybrid automatic repeat request (HARQ) scheduling and receiving parity bits associated with the acknowledgement information in an uplink-centric self-contained subframe that is sequentially subsequent to the multiple downlink-centric self-contained subframes. The systematic bits may be received in an uplink acknowledgement portion of each of the multiple downlink-centric self-contained subframes. The parity bits may be received in a data portion of the uplink-centric self-contained subframe.

The bit processing circuit/module 2026 may include circuitry and/or instructions (e.g., bit processing instructions 2036 stored on the storage medium 2004) adapted to perform several functions relating to, for example, processing the received systematic bits jointly with the received parity bits to decode the systematic bits.

The ACK/NACK recovering circuit/module 2028 may further include circuitry and/or instructions (e.g., ACK/NACK recovering instructions 2038 stored on the storage medium 2004) adapted to perform several functions relating to, for example, recovering the acknowledgement information based on the decoded systematic bits to detect whether the NACK-to-ACK error has occurred with respect to the acknowledgment information in a downlink-centric self-contained subframe.

As mentioned above, instructions stored by the storage medium 2004, when executed by the processing circuit 2010, causes the processing circuit 2010 to perform one or more of the various functions and/or process operations described herein. For example, the storage medium 2004 may include one or more of the control transmitting instructions 2030, the data transmitting instructions 2032, the bit receiving instructions 2034, the bit processing instructions 2036, and the ACK/NACK recovering instructions 2038.

FIG. 21 is a flowchart 2100 illustrating a method of wireless communication at a communication device (e.g., receiving device). The method may be performed by an apparatus (e.g., scheduling entity 202, apparatus 2000 employing processing circuit 2010, or any other suitable apparatus or means for carrying out the described functions).

Features of the flowchart 2100 may provide further detail to one or more features of the process 1100 of FIG. 11. For example, referring to the process 1100, after the apparatus detects that the UE is to use multiple subframes to send uplink control information (1102) or detects that the UE is to code the uplink control information over the multiple subframes (1106), the apparatus sends an indication (1104, 1108) to the UE corresponding to the detection. Accordingly, the apparatus may send the indication to the UE by transmitting downlink control information as described with respect to the flowchart 2100.

Referring to FIG. 21, the apparatus transmits, to a subordinate entity (e.g., UE), the downlink control information in a control portion of a downlink-centric self-contained subframe that is sequentially prior to multiple downlink-centric self-contained subframes 2102. The downlink control information may indicate a data portion of the sequentially prior downlink-centric self-contained subframe for transmitting data information to the subordinate entity and one or more acknowledgement portions of the multiple downlink-centric self-contained subframes for receiving acknowledgement information from the subordinate entity.

The apparatus further transmits, to the subordinate entity, the data information in the data portion of the sequentially prior downlink-centric self-contained subframe 2104. The acknowledgement information may indicate whether the data information was correctly received by the subordinate entity.

The apparatus receives systematic bits associated with the acknowledgement information in each of the multiple downlink-centric self-contained subframes 2106 and receives parity bits associated with the acknowledgement information in an uplink-centric self-contained subframe that is sequentially subsequent to the multiple downlink-centric self-contained subframes 2108. The apparatus may receive the systematic bits in an uplink acknowledgement portion of each of the multiple downlink-centric self-contained subframes. The apparatus may receive the parity bits in a data portion of the uplink-centric self-contained subframe.

The apparatus processes the received systematic bits jointly with the received parity bits to decode the systematic bits 2110. The apparatus recovers the acknowledgement information based on the decoded systematic bits to detect whether a NACK-to-ACK error occurred with respect to the acknowledgement information in a downlink-centric self-contained subframe 2112. Thereafter, the apparatus retransmits a lost data packet associated with the NACK-to-ACK error at a medium access control (MAC) or higher layer 2114.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within systems defined by 3GPP, such as Long-Term Evolution (LTE), the Evolved Packet System (EPS), the Universal Mobile Telecommunication System (UMTS), and/or the Global System for Mobile (GSM). Various aspects may also be implemented within evolved versions of an LTE network, such as a fifth-generation (5G) network. Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 11, 13, 19, and 21 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5, 10, 12, 18, and 20 may be configured to perform one or more of the methods, features, or steps described herein. The novel algorithms described herein may also be efficiently implemented in software and/or embedded in hardware.

What is claimed is:

1. A method of wireless communication at a communication device, comprising:
   detecting that a set of user equipment (UEs) is to use multiple subframes to send uplink control information;
   sending an indication of the detection to the set of UEs that the set of UEs is to use the multiple subframes to send the uplink control information;
   receiving systematic bits associated with acknowledgement information for at least two UEs of the set of UEs in each of multiple downlink-centric self-contained subframes to enable immediate hybrid automatic repeat request (HARQ) scheduling for the at least two UEs;
   receiving parity bits associated with the acknowledgement information for the at least two UEs in an uplink-centric self-contained subframe that is sequentially subsequent to the multiple downlink-centric self-contained subframes; and
   processing the received systematic bits jointly with the received parity bits for each of the at least two UEs to decode the systematic bits.

2. The method of claim 1, wherein the multiple subframes are consecutive subframes.

3. The method of claim 1, wherein the uplink control information includes physical uplink control channel (PUCCH) information.

4. The method of claim 1, wherein the uplink control information includes at least one of:
   channel quality information;
   precoding matrix information;
   a scheduling request;
   acknowledgement information; or
   beam quality information.

5. The method of claim 4, wherein the channel quality information includes at least one of:
   signal to noise ratio (SNR);
   signal to interference plus noise ratio (SINR);
   reference signal received power (RSRP);
   reference signal received quality (RSRQ); or
   received signal strength indicator (RSSI).

6. The method of claim 1, wherein the detecting comprises:
   detecting a link gain associated with a UE of the at least two UEs; and
   detecting, based on the link gain, whether the UE is to use the multiple subframes.

7. The method of claim 6, wherein the detecting the link gain comprises:
   receiving random access channel information from the UE; and
   calculating the link gain based on the random access channel information.

8. The method of claim 6, wherein the detecting the link gain comprises:
   receiving channel quality information (CQI) feedback from the UE in a previous subframe; and
   calculating the link gain based on the CQI feedback received in the previous subframe.

9. The method of claim 1, wherein the detecting comprises:
   detecting a payload size of uplink control information of a UE; and
   detecting, based on the payload size of the uplink control information, whether the UE is to use the multiple subframes.

10. The method of claim 1, wherein the detecting comprises:
    detecting a link gain associated with a UE;
    detecting a payload size of the uplink control information of the UE; and
    detecting, based on the link gain and payload size of the uplink control information, whether the UE is to use the multiple subframes.

11. The method of claim 1, wherein the detecting comprises:
    detecting an angle of arrival associated with a UE; and detecting, based on the angle of arrival, at least one group of UEs of the set of UEs that will be scheduled together to transmit simultaneously in a set of subframes.

12. The method of claim 11, wherein the detecting the angle of arrival comprises:
receiving directional random access channel information from the UE; and
calculating the angle of arrival based on the directional random access channel information.

13. The method of claim 11, wherein the detecting the angle of arrival comprises:
receiving channel quality information (CQI) feedback from the UE in a previous subframe; and
detecting the angle of arrival based on the CQI feedback received in the previous subframe.

14. The method of claim 1, further comprising:
recovering the acknowledgement information of a UE of the at least two UEs based on the decoded systematic bits to detect whether a NACK-to-ACK error has occurred with respect to the acknowledgement information in a downlink-centric self-contained subframe; and
retransmitting, to the UE, a lost data packet associated with the NACK-to-ACK error at a medium access control (MAC) or higher layer.

15. The method of claim 1, wherein the systematic bits are received in an uplink acknowledgement portion of each of the multiple downlink-centric self-contained subframes.

16. The method of claim 1, wherein the parity bits are received in a data portion of the uplink-centric self-contained subframe.

17. The method of claim 1, further comprising:
transmitting, to at least one UE of the set of UEs, downlink control information in a control portion of a downlink-centric self-contained subframe that is sequentially prior to the multiple downlink-centric self-contained subframes,
wherein the downlink control information indicates a data portion of the sequentially prior downlink-centric self-contained subframe for transmitting data information to the at least one UE and one or more acknowledgement portions of the multiple downlink-centric self-contained subframes for receiving the acknowledgement information from the at least one UE; and
transmitting, to the at least one UE, the data information in the data portion of the sequentially prior downlink-centric self-contained subframe,
wherein the acknowledgement information indicates whether the data information was correctly received.

18. A communication device configured to communicate in a wireless network, comprising:
a transceiver; and
a processing circuit coupled to the transceiver, wherein the processing circuit, via the transceiver, is configured to:
detect that a set of user equipment (UEs) is to use multiple subframes to send uplink control information;
send an indication of the detection to the set of UEs that the set of UEs is to use the multiple subframes to send the uplink control information;
receive systematic bits associated with acknowledgement information for a UE of the set of UEs in each of multiple downlink-centric self-contained subframes to enable immediate hybrid automatic repeat request (HARQ) scheduling for the UE;
receive parity bits associated with the acknowledgement information for the UE in an uplink-centric self-contained subframe that is sequentially subsequent to the multiple downlink-centric self-contained subframes; and
process the received systematic bits jointly with the received parity bits to decode the systematic bits.

19. The communication device of claim 18, wherein the processing circuit is further configured to:
recover the acknowledgement information based on the decoded systematic bits to detect whether a NACK-to-ACK error has occurred with respect to the acknowledgement information in a downlink-centric self-contained subframe; and
retransmit a lost data packet associated with the NACK-to-ACK error at a medium access control (MAC) or higher layer.

20. The communication device of claim 19, wherein the processing circuit is further configured to:
transmit, to the UE, downlink control information in a control portion of a downlink-centric self-contained subframe that is sequentially prior to the multiple downlink-centric self-contained subframes, wherein the downlink control information indicates a data portion of the sequentially prior downlink-centric self-contained subframe for transmitting data information to the UE and one or more acknowledgement portions of the multiple downlink-centric self-contained subframes for receiving the acknowledgement information from the UE; and
transmit, to the UE, the data information in the data portion of the sequentially prior downlink-centric self-contained subframe, wherein the acknowledgement information indicates whether the data information was correctly received by the UE.

* * * * *